United States Patent
Tatsuma

(10) Patent No.: US 9,769,334 B1
(45) Date of Patent: Sep. 19, 2017

(54) IMAGE PROCESSING DEVICE READING AN IMAGE AND TRANSMITTING READ IMAGE DATA, ON THE BASIS OF ACQUIRED PROCESSING INFORMATION ASSOCIATED WITH RECEIVED PROCESSING IDENTIFIER, TO STORING LOCATION ACCORDING TO THE PROCESSING INFORMATION, AND CORRESPONDING IMAGE PROCESSING SYSTEM, IMAGE PROCESSING METHOD, AND NON-TRANSITORY COMPUTER READABLE MEDIUM

(71) Applicant: FUJI XEROX CO., LTD., Tokyo (JP)

(72) Inventor: Noriyuki Tatsuma, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/204,688

(22) Filed: Jul. 7, 2016

(30) Foreign Application Priority Data

Mar. 16, 2016 (JP) .................................. 2016-052513

(51) Int. Cl.
  G06K 15/00 (2006.01)
  G06F 3/12 (2006.01)
  G06K 1/00 (2006.01)
  H04N 1/00 (2006.01)
  H04N 1/21 (2006.01)

(52) U.S. Cl.
  CPC ..... H04N 1/00244 (2013.01); H04N 1/00795 (2013.01); H04N 1/21 (2013.01); H04N 2201/0094 (2013.01)

(58) Field of Classification Search
  CPC .. H04N 1/00244; H04N 1/00795; H04N 1/21; H04N 2201/0094
  USPC .............................. 358/1.15, 1.1, 1.14, 1.13
  See application file for complete search history.

(56) References Cited

U.S. PATENT DOCUMENTS

2008/0252922 A1  10/2008  Ikegami et al.
2010/0188687 A1*  7/2010  Fukano ................. G06F 3/1204
                                        358/1.15
2016/0286053 A1*  9/2016  Akamine ............. H04N 1/0023

FOREIGN PATENT DOCUMENTS

JP  2007-074370 A  3/2007
JP  2008-263557 A  10/2008
JP  2011-041129 A  2/2011

* cited by examiner

Primary Examiner — Douglas Tran
(74) Attorney, Agent, or Firm — Oliff PLC

(57) ABSTRACT

An image processing device including a reception unit, an acquisition unit, an image reading unit, a transmission unit, and an instruction unit. The reception unit receives a processing identifier associated with image reading processing. The acquisition unit acquires processing information associated with the processing identifier, the processing information including at least information regarding a storing location and client's identification information. The image reading unit reads an image on the basis of the processing information. The transmission unit transmits data of the read image to the storing location according to the processing information. The instruction unit issues a print instruction to print the image on the basis of the client's identification information included in the processing information.

6 Claims, 22 Drawing Sheets

FIG. 6

| | NAME OF PARAMETER | EXAMPLE OF SPECIFICATION | NOTE |
|---|---|---|---|
| IDENTIFIER | | 1234567890 | |
| SCAN INSTRUCTION INFORMATION | SCAN SIZE | A4 | A3 ⋮ |
| | COLOR/MONOCHROME | COLOR | MONOCHROME COLOR |
| | RESOLUTION | 300 dpi | |
| | DOCUMENT TYPE | tiff | jpg ⋮ |
| | INSTRUCTION TYPE | PRINT | UPLOAD PRINT |
| | PRINTING DEVICE | device-x-yamaguchi-mf | DEVICE X |
| SCAN EXECUTING DEVICE | | device-a-sado-mf | SCANNER A |
| CLOUD INFORMATION | SCAN CLIENT CLOUD ACCOUNT | USER: yamaguchi@local.net PASS: password | |
| | SCAN IMAGE STORING LOCATION | cloud://local.net/yamaguchi/scandata/ | UPLOAD LOCATION |

FIG. 7

| No | QUEUE TYPE | CONTENT DETAILS |
|---|---|---|
| 1 | PRINT | CLOUD PRINT INSTRUCTION |
| 2 | PRINT | CLOUD PRINT INSTRUCTION |
| 3 | SCAN | CLOUD SCAN INSTRUCTION<br>· IDENTIFIER: 1234567890<br>· SCAN EXECUTING DEVICE<br>· SCAN INSTRUCTION INFORMATION<br>· CLOUD INFORMATION (CLOUD ACCOUNT OF USER X) |
| 4 | PRINT | CLOUD PRINT INSTRUCTION |
| 5 | SCAN | CLOUD SCAN INSTRUCTION |
| 6 | SCAN | CLOUD SCAN INSTRUCTION<br>· IDENTIFIER: 2468013579<br>· SCAN EXECUTING DEVICE<br>· SCAN INSTRUCTION INFORMATION<br>· CLOUD INFORMATION (CLOUD ACCOUNT OF USER X) |
| 7 | PRINT | CLOUD PRINT INSTRUCTION |
| : | : | |

FIG. 12

| | NAME OF PARAMETER | EXAMPLE OF SPECIFICATION | NOTE |
|---|---|---|---|
| 1210 — IDENTIFIER | | 1234567890 | |
| 1222 — | SCAN SIZE | A4 | A3 ⋮ |
| 1224 — | COLOR/MONOCHROME | COLOR | MONOCHROME COLOR |
| 1226 — | RESOLUTION | 300 dpi | |
| 1220 — SCAN INSTRUCTION INFORMATION | DOCUMENT TYPE | tiff | jpg ⋮ |
| 1228 — | INSTRUCTION TYPE | PRINT | UPLOAD PRINT |
| 1230 — | PRINTING DEVICE | device-x-yamaguchi-mf | DEVICE X |
| 1232 — | | device-a-sado-mf | SCANNER A |
| 1240 — SCAN EXECUTING DEVICE | | device-b-nagano-mf | SCANNER B |
| | | device-c-miyazaki-mf | SCANNER C |
| 1252 — CLOUD INFORMATION | SCAN CLIENT CLOUD ACCOUNT | USER: yamaguchi@local.net PASS: password | |
| 1250 — | SCAN IMAGE STORING LOCATION | cloud://local.net/yamaguchi/scandata/ | UPLOAD LOCATION |
| 1254 — | | | |

| | NAME OF PARAMETER | EXAMPLE OF SPECIFICATION | NOTE |
|---|---|---|---|
| 1610 — IDENTIFIER | | 1234567890 | |
| 1622 | SCAN SIZE | A4 | A3 ⋮ |
| 1624 | COLOR/MONOCHROME | COLOR | MONOCHROME COLOR |
| 1626 | RESOLUTION | 300 dpi | |
| 1628 | DOCUMENT TYPE | tiff | jpg ⋮ |
| 1620 SCAN INSTRUCTION INFORMATION | | | |
| 1630 | INSTRUCTION TYPE | PRINT | UPLOAD PRINT |
| 1632 | PRINTING DEVICE | device-x-yamaguchi-mf | DEVICE X |
| | | device-y-hagi-mf | DEVICE Y |
| | | device-z-nagato-mf | DEVICE Z |
| 1640 — SCAN EXECUTING DEVICE | | device-a-sado-mf | SCANNER A |
| 1652 | SCAN CLIENT CLOUD ACCOUNT | USER: yamaguchi@local.net PASS: password | |
| 1650 CLOUD INFORMATION | | | |
| 1654 | SCAN IMAGE STORING LOCATION | cloud://local.net/yamaguchi/scandata/ | UPLOAD LOCATION |

1600

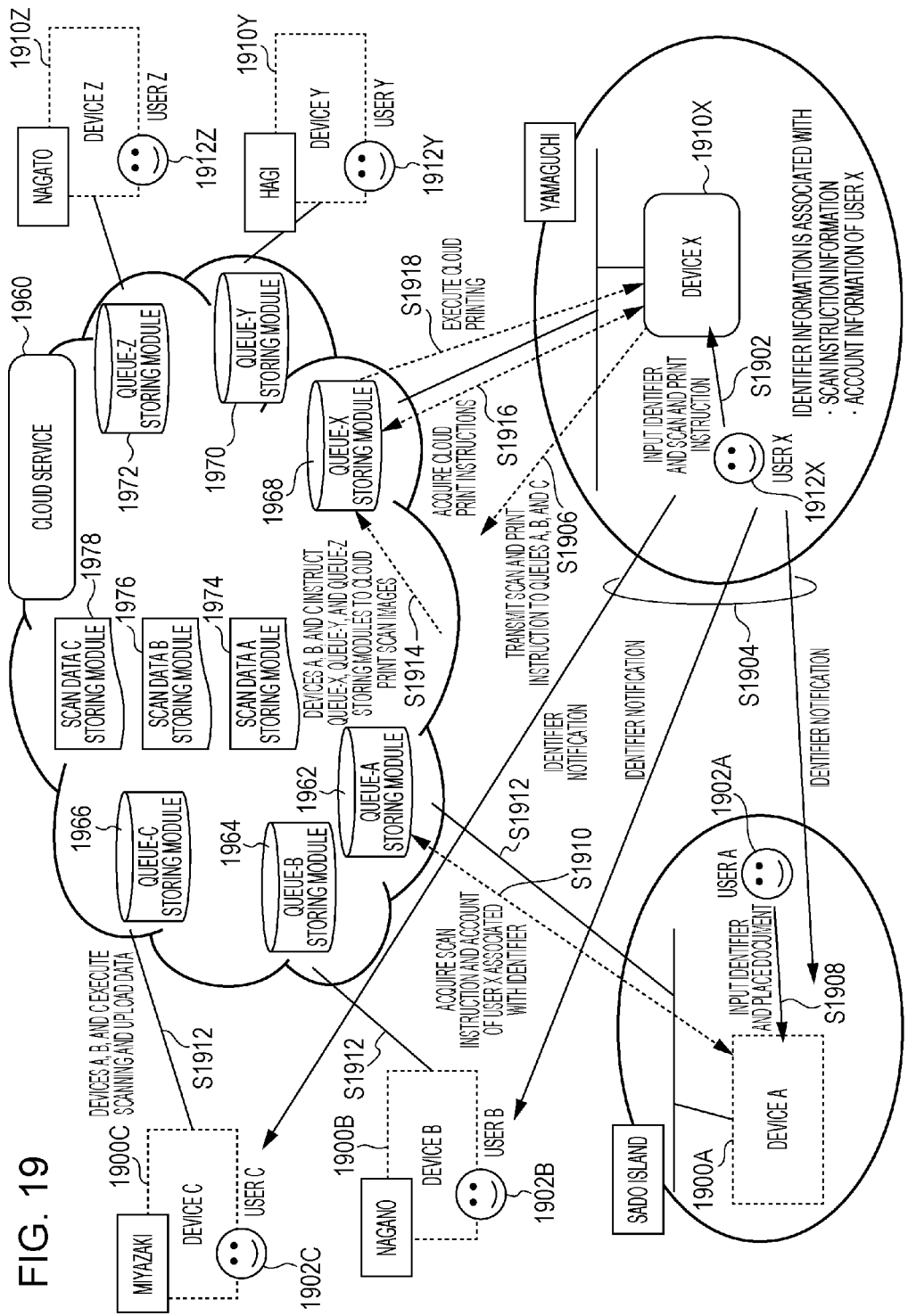

FIG. 20

| | NAME OF PARAMETER | EXAMPLE OF SPECIFICATION | NOTE |
|---|---|---|---|
| 2010 — IDENTIFIER | | 1234567890 | |
| 2022 — | SCAN SIZE | A4 | A3 ⋮ |
| 2024 — | COLOR/MONOCHROME | COLOR | MONOCHROME COLOR |
| 2026 — | RESOLUTION | 300 dpi | |
| 2028 — | DOCUMENT TYPE | tiff | jpg ⋮ |
| 2020 — SCAN INSTRUCTION INFORMATION | | | |
| 2030 — | INSTRUCTION TYPE | PRINT | UPLOAD PRINT |
| 2032 — | PRINTING DEVICE | device-x-yamaguchi-mf | DEVICE X |
| | | device-y-hagi-mf | DEVICE Y |
| | | device-z-nagato-mf | DEVICE Z |
| 2040 — SCAN EXECUTING DEVICE | | device-a-sado-mf | SCANNER A |
| | | device-b-nagano-mf | SCANNER B |
| | | device-c-miyazaki-mf | SCANNER C |
| 2052 — CLOUD INFORMATION | SCAN CLIENT CLOUD ACCOUNT | USER: yamaguchi@local.net PASS: password | |
| 2054 — | SCAN IMAGE STORING LOCATION | cloud://local.net/yamaguchi/scandata/ | UPLOAD LOCATION |

2000

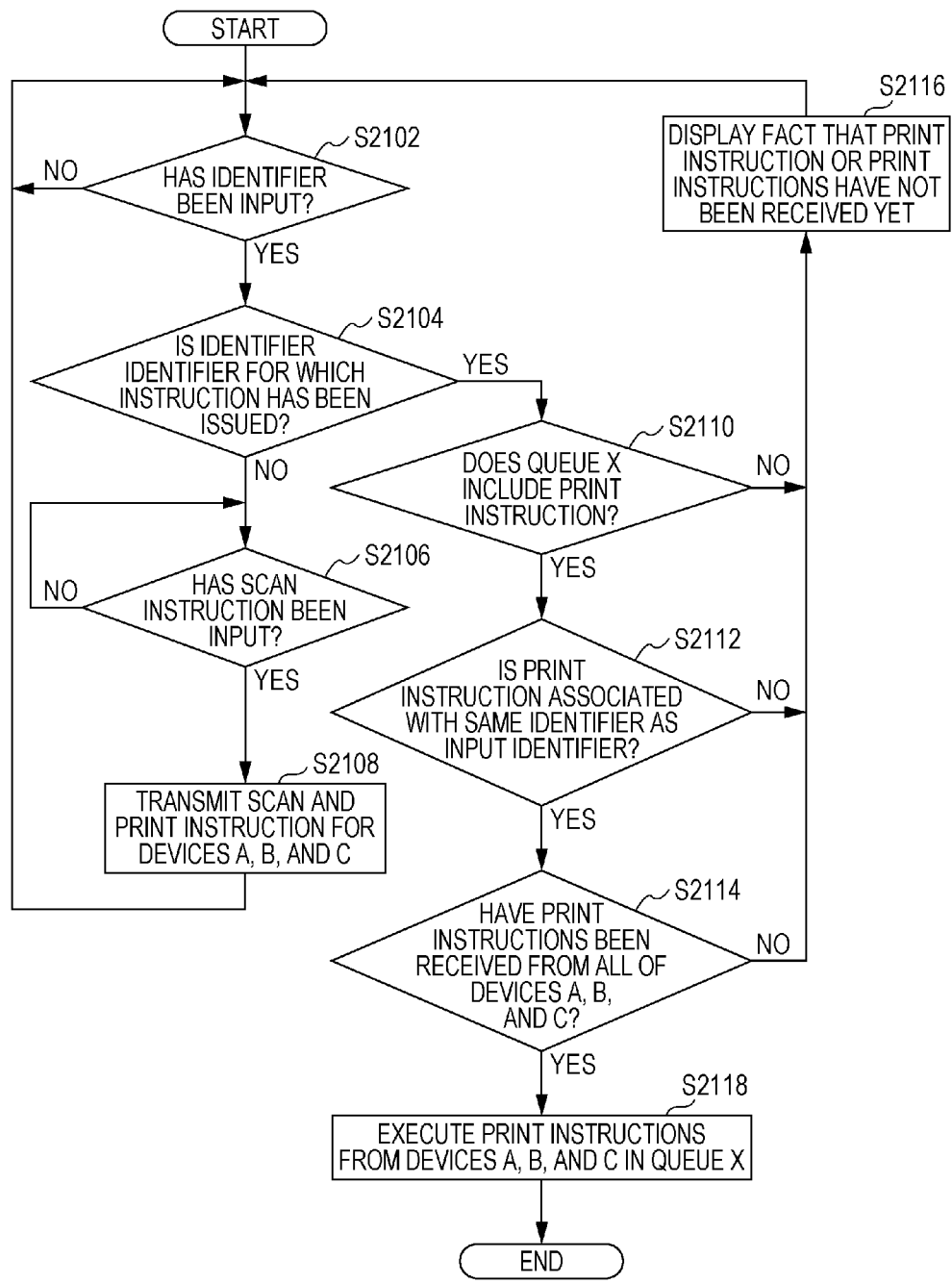

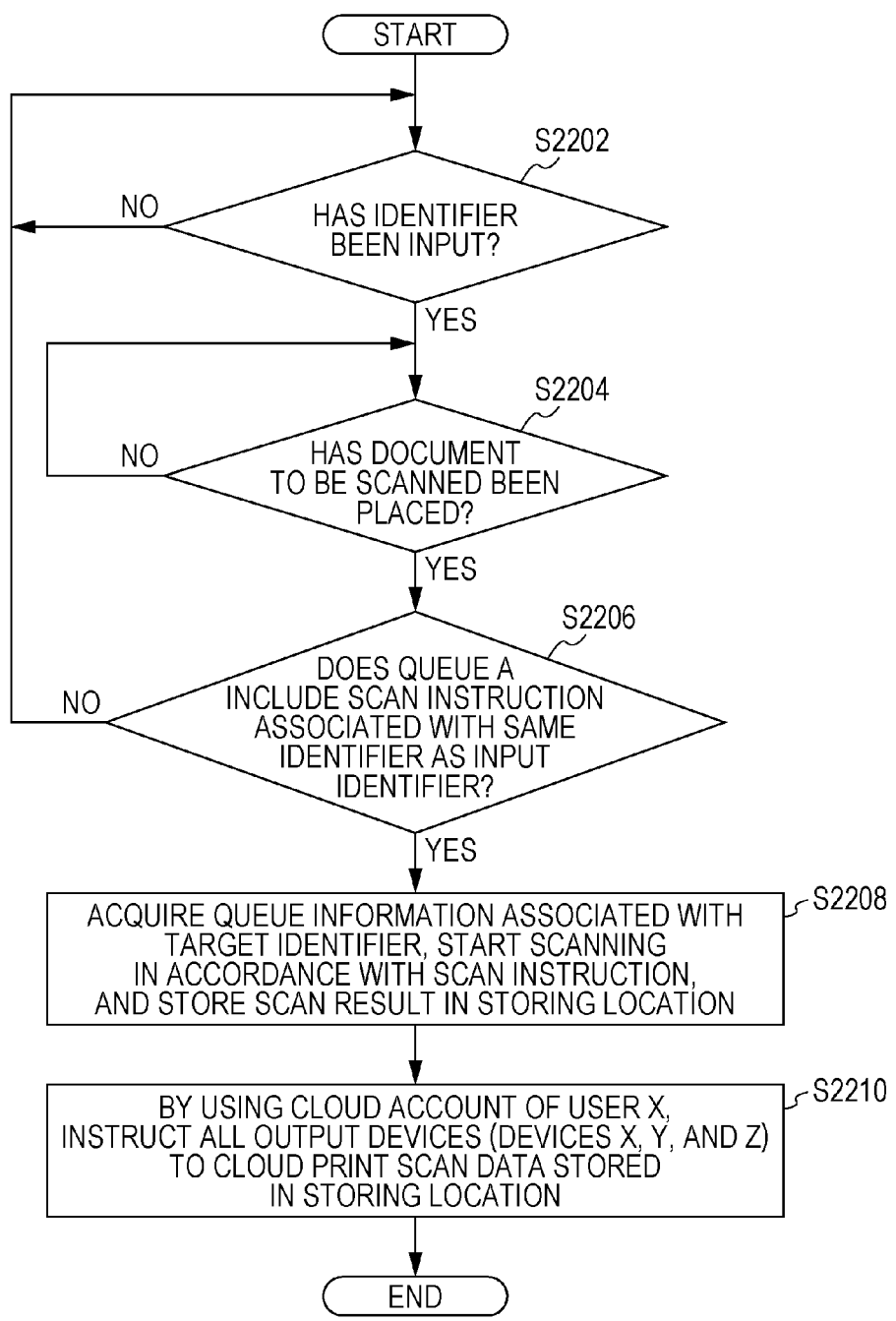

IMAGE PROCESSING DEVICE READING AN IMAGE AND TRANSMITTING READ IMAGE DATA, ON THE BASIS OF ACQUIRED PROCESSING INFORMATION ASSOCIATED WITH RECEIVED PROCESSING IDENTIFIER, TO STORING LOCATION ACCORDING TO THE PROCESSING INFORMATION, AND CORRESPONDING IMAGE PROCESSING SYSTEM, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-052513 filed Mar. 16, 2016.

BACKGROUND

Technical Field

The present invention relates to an image processing device, an image processing system, an image processing method, and a non-transitory computer readable medium.

SUMMARY

According to an aspect of the invention, there is provided an image processing device including a reception unit, an acquisition unit, an image reading unit, a transmission unit, and an instruction unit. The reception unit receives a processing identifier associated with image reading processing. The acquisition unit acquires processing information associated with the processing identifier, the processing information including at least information regarding a storing location and client's identification information. The image reading unit reads an image on the basis of the processing information. The transmission unit transmits data of the read image to the storing location according to the processing information. The instruction unit issues a print instruction to print the image on the basis of the client's identification information included in the processing information.

BRIEF DESCRIPTION OF THE DRAWINGS

An exemplary embodiment of the present invention will be described in detail based on the following figures, wherein:

FIG. 6 illustrates a data structure example of an instruction information table;

FIG. 7 illustrates a data structure example of a queue table;

FIG. 12 illustrates a data structure example of an instruction information table;

FIG. 16 illustrates a data structure example of an instruction information table;

FIG. 19 illustrates a fourth process example according to the exemplary embodiment;

FIG. 20 illustrates a data structure example of an instruction information table;

FIG. 21 is a flowchart illustrating a process example according to the exemplary embodiment;

FIG. 22 is a flowchart illustrating a process example according to the exemplary embodiment.

DETAILED DESCRIPTION

An exemplary embodiment to implement the present invention is now described below with reference to the drawings.

Figure 1:
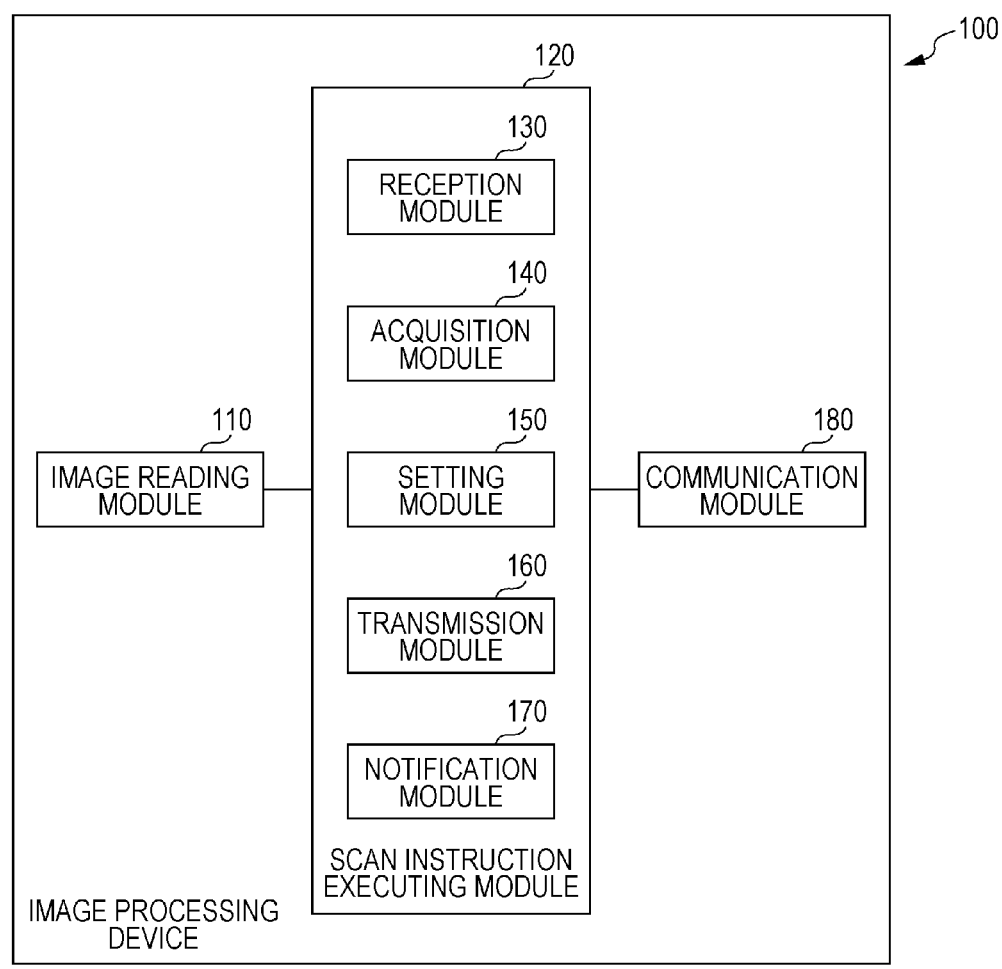
FIG. 1 illustrates a conceptual diagram illustrating a module configuration example according to the exemplary embodiment.

FIG. 1 is a conceptual diagram illustrating a module configuration example according to the exemplary embodiment.

Note that the term "module" generally means a logically separable component of software (computer program), hardware, or the like. Accordingly, a module in the exemplary embodiment refers to not only a module in a computer program but also a module in a hardware configuration. Therefore, the exemplary embodiment will also illustrate a computer program for realizing the function of such a module (a program for causing a computer to execute each step, a program for causing a computer to function as each unit, or a program for causing a computer to realize each function), a system therefor, and a method therefor. For the convenience of description, "store Y", "cause X to store Y", or a similar expression will be used. In an exemplary embodiment illustrating a computer program, such an expression means to cause a memory device (X) to store Y or to perform control in such a manner as to cause a memory device (X) to store Y. Modules and functions may correspond to each other in a one-to-one relationship. Alternatively, in implementation, a single program may realize a single module or plural modules. Conversely, plural programs may realize a single module. Plural modules may be executed by a single computer, or a single module may be executed by plural computers in a distributed or parallel environment. In addition, a single module may include another module. The term "connect" is herein used to describe a physical connection or a logical connection (e.g., data transfer, instruction transmission, or data cross-reference). The term "predetermined" means a state where something is determined prior to a target process and includes the meaning of not only being determined before the starting of a process according to the exemplary embodiment but also being determined before the target process even after the starting of a process according to the exemplary embodiment, in accordance with the current or previous status and conditions. If there are plural "predetermined values", these values may be mutually different values, or two or more values may be the same (it is needless to say that all the values may be the same). In addition, an expression such as "if A, B" is used to indicate that whether or not A is determined, and if it is determined that A, then B. However, this does not apply to the case where the determination as to whether or not A is unnecessary.

Furthermore, a system or a device may be configured by connecting plural computers, hardware components, devices, and the like to one another by using a communication unit, such as a network (including one-to-one-correspondence communication connection), or may be configured by a single computer, hardware component, device, and the like. Note that the terms "system" and "device" are used as synonyms. It may be needless to say that the term "system" does not mean a social mechanism (social system), which is settled by humans.

Furthermore, in the case where plural processes are performed by the respective modules or within a module, target information is read from a memory device in each process, and after the process has been performed, the process result is written to the memory device. Accordingly, description of the reading of information from the memory device before a process and the writing of information to the memory device after the process will be omitted in some cases. Note that examples of the memory device herein may include a hard disk, a random access memory (RAM), an external memory medium, a memory device connected via a communication line, and a register in a central processing unit (CPU).

An image processing device 100 according to the exemplary embodiment allows a scan executor to perform image reading in accordance with a setting performed by a scan client and includes an image reading module 110, a scan instruction executing module 120, and a communication module 180 as illustrated in the example of FIG. 1. Specifically, the scan client specifies scan parameters, an image storing location, and an image printing device, and then data of an image that the scan executor has instructed to scan is transferred through a network. Note that the scan executor is a different person from the scan client.

The image reading module 110 is connected to the scan instruction executing module 120 and reads an image of a document that is placed on the image processing device 100. That is, the image reading module 110 is a so-called scanner. The image is read in accordance with a setting of scan parameters. A single image may be read, or plural images may be read. Although the content of the image is not limited to a particular content, the image is typically of a document that the scan client has instructed the scan executor to scan or a document that the scan executor desires to transmit to the scan client. For example, the image may be of a document used for business, a family tree, or the like.

The scan instruction executing module 120 includes a reception module 130, an acquisition module 140, a setting module 150, a transmission module 160, and a notification module 170 and is connected to the image reading module 110 and the communication module 180.

The reception module 130 receives a processing identifier (also referred to as a personal identification number (PIN) code, and hereinafter also referred to as an identifier) associated with image reading processing. For example, the reception module 130 receives a processing identifier through an operation (specifically, an operation on a touch panel, a voice, a line of sight, a gesture, or the like) performed by the scan executor on a user interface device (specifically, a touch panel, a mouse, a keyboard, a microphone, a camera, or the like) provided for the image processing device 100. The processing identifier here includes characters (e.g., numbers, letters, katakana, hiragana, or kanji). Such characters may be input by using a keyboard or the like. Alternatively, an information image from which such characters are readable may be read. Note that the term "information image" refers to a machine readable image code that is systematically formed to indicate electronic data, and is specifically a one-dimensional barcode, a two-dimensional code, or the like. As a two-dimensional code, a quick response (QR) code (registered trademark) may be used.

Note that the scan client notifies the scan executor of the processing identifier in advance. As the notification method, for example, the scan client may convey the processing identifier verbally (typically over the telephone since the scan executor is at a distant location), by mail, or by email, for example. In the case of using an information image including the processing identifier, a sheet of paper on which the information image has been printed may be handed, or data thereof may be transmitted by email or the like. The scan executor causes a camera (barcode reader) of the image processing device 100 to read the information image.

The acquisition module 140 acquires processing information (hereinafter also referred to as scan instruction information) associated with the processing identifier received by the reception module 130. The processing information here includes at least scan parameters, information regarding an image storing location, information regarding an image printing device, and client's log-in information.

The acquisition module 140 may acquire the processing information associated with the processing identifier from a server. Examples of the server include a cloud server 250, which will be described later with reference to FIG. 2, and other servers. The processing identifier is transmitted to the server, and the server transmits processing information associated with the processing identifier, and accordingly, receiving the processing information may suffice.

In addition, if there are plural pieces of processing information associated with a single processing identifier, the acquisition module 140 may display an error message indicating that plural pieces of processing information are associated with a single processing identifier. That is, this case corresponds to the case where the scan client and another operator have created the same processing identifier.

If the acquired processing information lacks one or more scan parameters for the image reading module 110, the acquisition module 140 may receive the lacking scan parameters through an operation performed by an operator.

In addition, if the acquired processing information lacks one or more scan parameters for the image reading module 110, the acquisition module 140 may notify a person who has created the processing information (the above-described scan client) of the lack of scan parameters by email or the like. Then, the lacking scan parameters may be compensated for by using scan parameters included in a reply email.

The setting module 150 sets, in the image reading module 110, the scan parameters included in the processing information acquired by the acquisition module 140. The scan parameters here include, for example, a scan size, specification about color/monochrome, a resolution, a document type, and the like.

Once the setting module 150 sets the scan parameters, the image reading module 110 reads the image. That is, the image reading module 110 reads the image on the basis of the processing information acquired by the acquisition module 140.

In addition, the image reading module 110 may display, upon reception of the processing identifier, information regarding a scan client included in the processing information associated with the processing identifier. Furthermore, the image reading module 110 may read, upon reception of a confirmation operation, the image on the basis of the processing information. That is, the image is read if the notification module 170 receives the confirmation operation.

In the case where a valid period is set for the processing information, the setting module 150 may determine whether or not the current time is within the valid period. If the current time is not within the valid period, the setting module 150 may not set the scan parameters included in the processing information. In this case, the setting module 150 may display an error message indicating that the current time is not within the valid period and may disenable scanning.

In the case where the processing information includes an encryption code, the setting module 150 may receive an encryption code through an operation performed by the scan executor. In this case, it is determined whether or not the encryption code included in the processing information is identical to the encryption code acquired through the operation performed by the scan executor. If the encryption codes are identical to each other, the scan parameters may be set in the image reading module 110; if not, the scan parameters may not be set, disenabling scanning.

The transmission module 160 transmits, to the storing location according to the processing information, data of the image read by the image reading module 110.

Then, on the basis of the client's identification information included in the processing information, the transmission module 160 issues a print instruction to print the image. For example, the transmission module 160 logs in to the storing location by using the client's log-in information included in the processing information and issues a print instruction to print the image.

In addition, the transmission module 160 may display information regarding the storing location prior to transmitting the data of the image read by the image reading module 110, and, upon reception of a confirmation operation, may transmit the data of the image to the storing location. That is, the data of the image is transmitted if the notification module 170 receives the confirmation operation.

Furthermore, if the scan parameters included in the processing information are not appropriate for image reading, the transmission module 160 may transmit, to the server, information indicating that the scan parameters are not appropriate for image reading.

Prior to transmitting the data of the image read by the image reading module 110, the notification module 170 displays information regarding the storing location and receives a confirmation operation. Thus, the scan executor is able to check the storing location. The term "confirmation operation" is an operation indicating that the transmission of the data of the image to the storing location is permitted, and the confirmation operation corresponds to, for example, a pressing of an "OK" button on a display device, such as a liquid crystal display, of the image processing device 100. It is needless to say that the transmission module 160 does not transmit the data of the image if the transmission thereof is not permitted.

When the reception module 130 receives the processing identifier, the notification module 170 may display, on the display device, information regarding the scan client according to the processing information associated with the processing identifier and may receive a confirmation operation. Thus, the scan executor is able to check who the scan client is.

The communication module 180 is connected to the scan instruction executing module 120 and performs communication with the outside. The outside here includes at least the above-described server (the cloud server 250) and may include an image processing device 200 (having a printing function) used by the scan client, for example.

Figure 2:
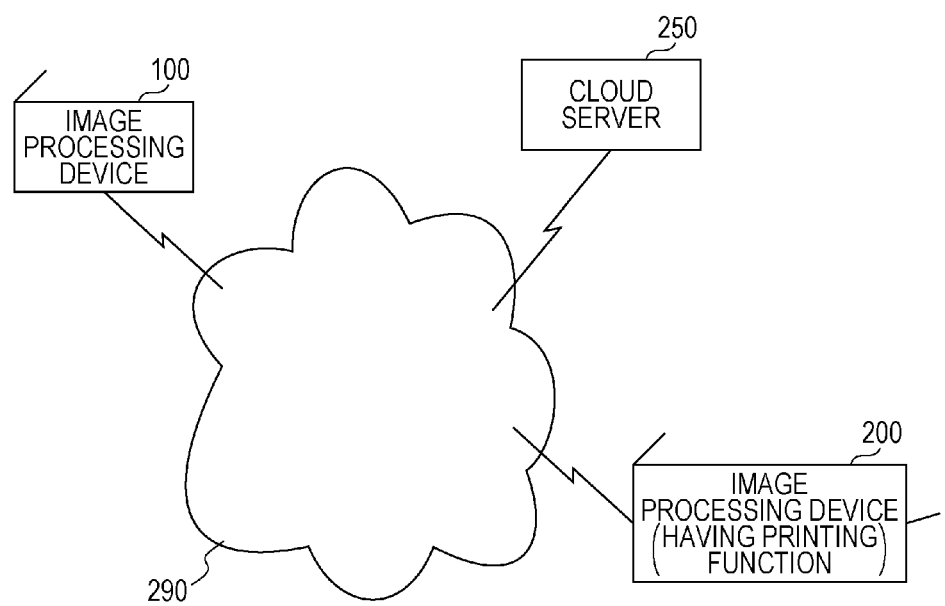
FIG. 2 illustrates a system configuration example using the exemplary embodiment.

FIG. 2 illustrates a system configuration example using the exemplary embodiment.

The image processing device 100, the image processing device 200 (having a printing function), and the cloud server 250 are connected to one another via a communication line 290. The communication line 290 may be a wireless line, a wired line, or a combination thereof, and may be, for example, a line to the Internet as a communication infrastructure, an intranet, or the like. Note that the image processing device 100 is a scanner, a printer, a multifunction peripheral (an image processing device having at least a scanner and also a printer function, a copying machine function, a facsimile function, and the like), a digital camera, or the like. In addition, the image processing device 200 (having a printing function) has a printing function, and is a printer, a multifunction peripheral (an image processing device having at least a printer and also a scanner function, a copying machine function, a facsimile function, and the like), or the like.

The cloud server 250 includes a communication unit that performs communication with the image processing device 100 and the image processing device 200 (having a printing function). For example, the communication unit receives a processing identifier and processing information from the image processing device 200 (having a printing function), receives a processing identifier from the image processing device 100, transmits the processing information associated with the processing identifier to the image processing device 100, receives a scan image (digital data) obtained as a result of image reading by the image processing device 100 from the image processing device 100, receives log-in information from the image processing device 100, and receives a print instruction to print the scan image. The cloud server 250 also includes a storing unit that stores the processing identifier and processing information in a queue and that stores the scan image from the image processing device 100. In addition, upon reception of the log-in information from the image processing device 100, the cloud server 250 performs log-in processing. Furthermore, upon reception of the print instruction, the cloud server 250 performs control in such a manner that the scan image stored in the storing unit becomes printable by using a printing device according to the processing information.

The processing information is transmitted from the image processing device 200 (having a printing function) to be stored in the cloud server 250, and the image processing device 100 acquires the processing information from the cloud server 250. Then, the scan image obtained as a result of image reading by the image processing device 100 is transmitted to the cloud server 250 (the storing location according to the processing information), and the cloud server 250 stores the scan image and transmits the scan image to the image processing device 200 (having a printing function). Then, the image processing device 100 logs in to the cloud server 250 by using the client's log-in information and issues the print instruction to print the scan image.

Figure 3:
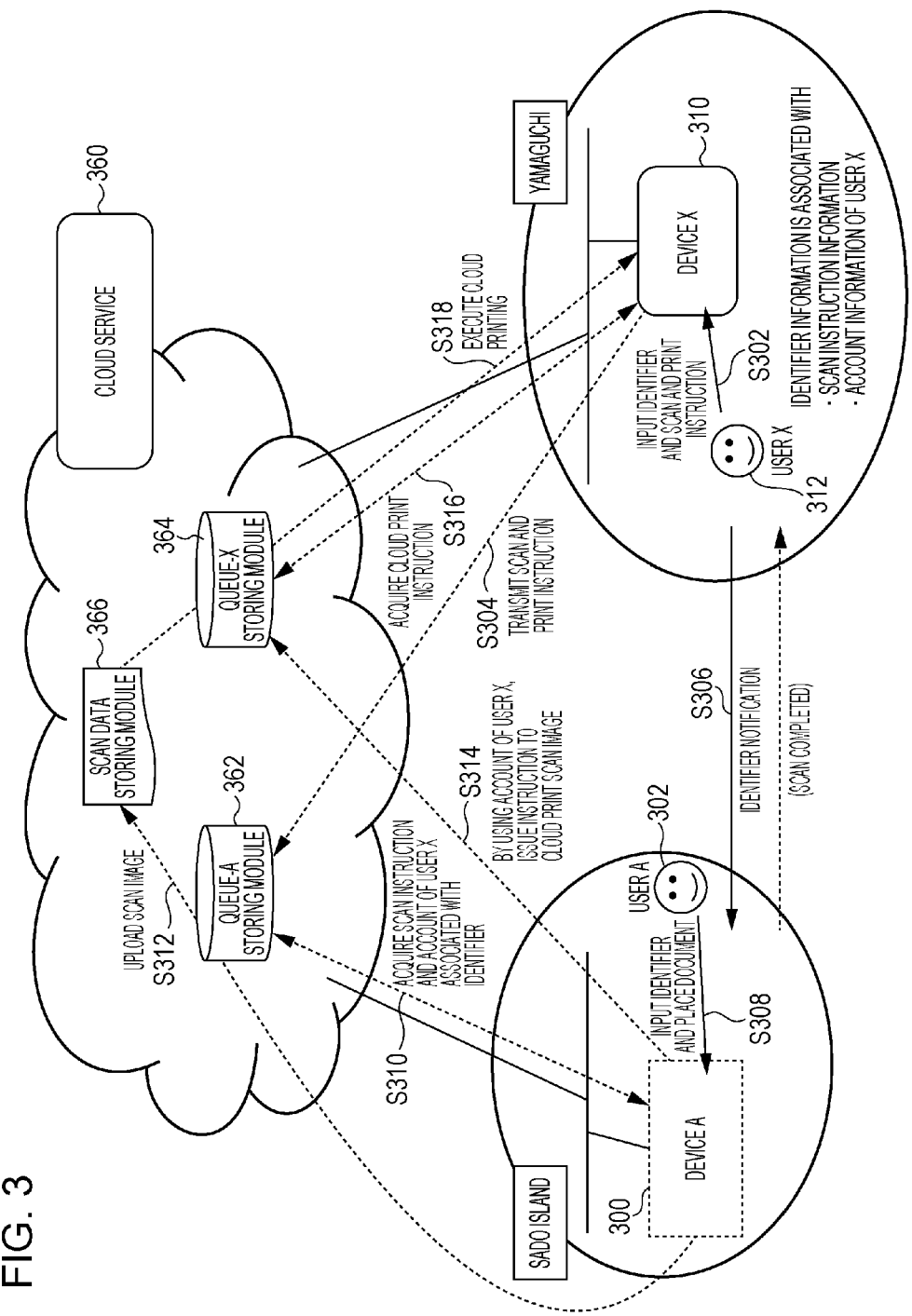
FIG. 3 illustrates a first process example according to the exemplary embodiment.

FIG. 3 illustrates a first process example according to the exemplary embodiment, which is a process example corresponding to the example illustrated in FIG. 2. The example of FIG. 3 illustrates a case where a device X 310 and a device A 300 have a one-to-one correspondence relationship.

In the related art (technology that does not use the exemplary embodiment), if a user (corresponding to a user X 312) desires to acquire a scan image of a document at a distant location, the user acquires the scan image by, for example, asking the owner (corresponding to a user A 302) of the document at the distant location to scan the document and to upload the scan image thereof to a cloud service (corresponding to a cloud service 360).

However, if the owner at the distant location is not accustomed to digital equipment, great efforts are made as follows: (a) the client goes to the distant location to scan the document to convert the document to digital data and stores the data in a cloud server; (b) the client asks the owner to send the document by mail to the client, converts it to a scan image, and sends back the document; and (c) the client asks another person who is accustomed to digital equipment to execute scanning. In addition, in the case where the client asks a person who is accustomed to digital equipment to execute scanning, a great burden is still imposed on the scan executor. This is because the client has to provide scan parameters (e.g., resolution, image format, and color/monochrome) and information regarding a scan image storing location that the client desires, and a scan executor, who has been asked to execute scanning, has to do the corresponding operation. Furthermore, it is difficult for the scan executor to specify a printer of the scan client as a printer to print the scan image.

According to the exemplary embodiment illustrated in the example of FIG. 3, the device X 310 is used by the user X 312, who is the scan client, and the device A 300 is used by the user A 302, who is the scan executor. For example, the user X 312 and the user A 302 are at distant locations from each other (Yamaguchi and Sado Island, respectively). Note that the user X 312 and the user A 302 are not necessarily at distant locations as long as the user X 312 asks the user A 302 to execute scanning. The device A 300 corresponding to the image processing device 100, the cloud service 360 corresponding to the cloud server 250, and the device X 310 corresponding to the image processing device 200 (having a printing function) are connected to one another via a communication line.

Figure 4:
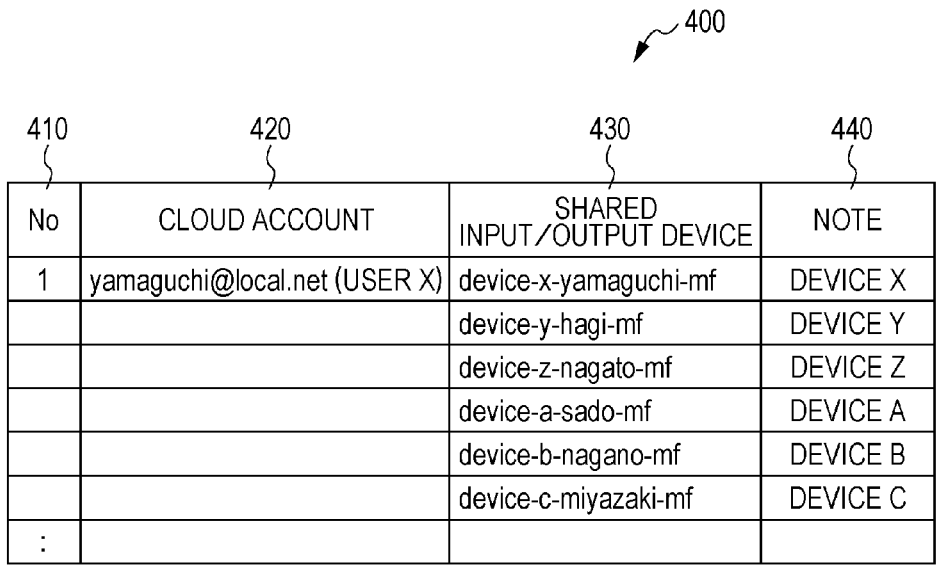
FIG. 4 illustrates a data structure example of an input/output device information table shared between cloud accounts.

The account information (log-in information) of the user X 312 is shared between the device A 300 and the device X 310 in advance. For example, in accordance with an input/output device information table 400 shared between cloud accounts, the account of the user X 312 in the cloud service 360 is shared between the device A 300 and the device X 310. FIG. 4 illustrates a data structure example of the input/output device information table 400 shared between cloud accounts. The input/output device information table 400 shared between cloud accounts includes a No field 410, a cloud account field 420, a shared input/output device field 430, and a note field 440. The No field 410 stores numbers (Nos). The cloud account field 420 stores cloud accounts. The shared input/output device field 430 stores shared input/output devices. The note field 440 stores notes. The note field 440 is not necessarily provided. Note that accounts are similarly shared between devices illustrated in examples of FIGS. 10, 15, and 19.

Referring back to FIG. 3, in step S302, the device X 310 receives an identifier and a scan and print instruction (corresponding to processing information) in accordance with an operation performed by the user X 312. An example of the scan and print instruction is an instruction information table 600. FIG. 6 illustrates a data structure example of the instruction information table 600. The instruction information table 600 includes an identifier field 610, a scan instruction information field 620, a scan executing device field 640, and a cloud information field 650. The scan instruction information field 620 includes a scan size field 622, a color/monochrome field 624, a resolution field 626, a document-type field 628, an instruction-type field 630, and a printing device field 632. The cloud information field 650 includes a scan client cloud account field 652 and a scan image storing location field 654. The identifier field 610 stores the identifier. The identifier is associated with the following information: information in the scan instruction information field 620, the scan executing device field 640, and the cloud information field 650. Note that the identifier here may be created by the user X 312, who is the scan client, or may be automatically generated by the device X 310. As a process in which the device X 310 generates a unique identifier, for example, the device X 310 may generate the identifier from a time stamp, a unique identifier assigned to the device X 310, a unique identifier assigned to a communication module of the device X 310, or the like on the basis of a known algorithm. Then, the device X 310 may present the identifier (as a text or an information image, such as a two-dimensional code, as described above) to the user X 312, who is the scan client, or may issue an instruction to use the identifier (to notify the scan executor (the user A 302 here) of the identifier). An example of the content in the identifier field 610 is "1234567890" or the like. The scan instruction information field 620 stores scan instruction information. The scan size field 622 stores a scan size. An example of the content in the scan size field 622 is "A4", and another example thereof is "A3" or the like. The color/monochrome field 624 stores information regarding color/monochrome/etc. specification. An example of the content in the color/monochrome field 624 is "color", and another example thereof is "monochrome (binary image)", "gray image", or the like. The resolution field 626 stores a resolution. An example of the content in the resolution field 626 is "300 dpi", and another example thereof is "400 dpi" or the like. The document-type field 628 stores a document type. An example of the content in the document-type field 628 is "tiff", and another example thereof is "jpg" or the like. The instruction-type field 630 stores the type of an instruction to be executed. An example of the content in the instruction-type field 630 is details of processing according to the instruction information table 600, such as "upload" processing, which corresponds to merely storing a scan image, and "printing" processing for the uploaded scan image. The printing device field 632 stores information regarding a printing device. The content in the printing device field 632 is the identifier (including the name) of a printer, which is the printing device, such as "device-x-yamaguchi-mf" indicating the device X 310. The scan executing device field 640 stores information regarding a scan executing device. The content in the scan executing device field 640 is the identifier (including the name) of a scanner, such as "device-a-sado-mf". The cloud information field 650 stores cloud information, specifically, information (log-in information) used to log in to the cloud service 360 and information regarding a scan image storing location. The scan client cloud account field 652 stores a scan client's cloud account. An example of the content in the scan client cloud account field 652 is a user name ("yamaguchi@local.net"), a password ("password"), or the like. Another example thereof may be information that is necessary if using OAuth or the like. The scan image storing location field 654 stores information regarding a scan image storing location. The content in the scan image storing location field 654 is the identifier of a location to which the scan image is uploaded, such as a uniform resource locator (URL) "cloud://local.net/yamaguchi/scandata/" indicating a scan data storing module 366, which is a storing location in the cloud service 360.

Figure 5:
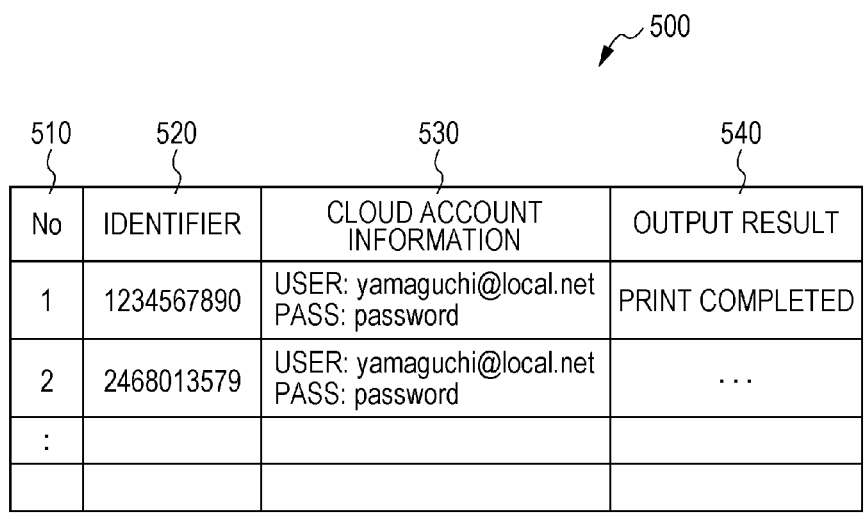
FIG. 5 illustrates a data structure example of a device-X register information table.

In addition, in step S302, the device X 310 stores the identifier and account information or the like of the user X 312 in the cloud service 360 in association with each other. For example, the device X 310 stores a device-X register information table 500. FIG. 5 illustrates a data structure example of the device-X register information table 500. The device-X register information table 500 includes a No field 510, an identifier field 520, a cloud account information field 530, and an output result field 540. The No field 510 stores numbers (Nos). The identifier field 520 stores the identifier created in step S302 (corresponding to the identifier field 610 in the instruction information table 600). The cloud account information field 530 stores account information used in the cloud service 360. The output result field 540 stores output result statuses (e.g., "print completed" or "uncompleted") in the instruction information table 600 associated with the identifier (specifically, the printer according to the printing device field 632).

Referring back to FIG. 3, in order to specify a printing device (the content in the printing device field 632 in the instruction information table 600) other than the device X 310, it is acceptable to provide a unit that searches a network and that displays a list to allow selection of a printing device in step S302. In this case, the following condition may be set: the account information of the user X 312 in the cloud service 360 have already been shared.

It is also acceptable to provide a unit that acquires, from the cloud service 360, a list of printing devices that have been registered for the account of the user X 312 in the cloud service 360 and that displays a list to allow selection of a printing device in step S302.

If the instruction information table 600 stored in a queue-A storing module 362 is discarded (deleted) owing to time-out according to the specification of the cloud service 360, scan processing in accordance with the instruction information table 600 is not possible any longer. Accordingly, the device X 310 regularly monitors the contents in the queue-A storing module 362 and a queue-X storing module 364 in order to check whether or not the instruction information table 600 has been discarded. It is acceptable to provide a unit that presents, if neither of the queue-A storing module 362 and the queue-X storing module 364 includes the instruction information table 600 associated with the identifier, cancellation of the scan instruction the next time the user X 312 inputs an identifier.

In step S304, the device X 310 transmits the identifier and the scan and print instruction (the instruction information table 600) to the cloud service 360. In the cloud service 360, the queue-A storing module 362 is caused to store the instruction information table 600.

In step S306, the user X 312 notifies the user A 302 of the identifier. For example, the notification may be over the telephone.

Either of step S304 and step S306 may be performed earlier than the other.

In step S308, the device A 300 receives the identifier in accordance with an operation performed by the user A 302. Then, a document is placed.

In step S310, the device A 300 acquires, from the cloud service 360, the instruction information table 600 (including the scan instruction information, the account information of the user X 312, and other information) associated with the identifier. For example, the device A 300 searches the queue-A storing module 362 of the cloud service 360 to acquire the instruction information table 600 associated with the identifier. The queue-A storing module 362 stores, for example, a queue table 700. FIG. 7 illustrates a data structure example of the queue table 700. The queue table 700 includes a No field 710, a queue-type field 720, and a content details field 730. The No field 710 stores numbers (Nos). The queue-type field 720 stores types of queues (e.g., the content in the instruction-type field 630 in the instruction information table 600). The content details field 730 stores contents of queues (e.g., the instruction information table 600).

Referring back to FIG. 3, in step S312, the device A 300 reads the document and uploads the obtained scan image to the cloud service 360. The cloud service 360 stores the scan image in the scan data storing module 366.

In step S314, by using the account of the user X 312, the device A 300 instructs the cloud service 360 to cloud print the scan image. The device A 300 logs in to the cloud service 360 as the user X 312 by using the account information of the user X 312 according to the instruction information table 600 (specifically, the scan client cloud account field 652) and instructs the device X 310 to cloud print the scan image (the scan image uploaded to the scan data storing module 366 of the cloud service 360), and the process performed by the device A 300 ends. This cloud print instruction is stored in the queue-X storing module 364.

In step S316, the device X 310 acquires the cloud print instruction from the cloud service 360.

Specifically, the device X 310 acquires, from the queue-X storing module 364, the cloud print instruction, and acquires, from the scan data storing module 366, the scan image for which the instruction has been issued. Then, the device X 310 prints the scan image.

Note that the device X 310 may regularly monitor the queue-X storing module 364 and may print the scan image if there is a cloud print instruction. Alternatively, the device X 310 may print the scan image upon reception of the identifier through an operation performed by the user X 312. In particular, in the case where there is a difference in time between the areas of the device A 300 and the device X 310, even if the device A 300 scans a document in the daytime, it may be nighttime, for example, in the area of the device X 310. Accordingly, the user X 312, who is the scan client, might not be in front of the device X 310. It is acceptable to provide a unit that performs control in such a manner that the scan image is printed upon reception of the identifier again through an operation performed by the user X 312 in the case where a cloud print instruction is received.

In addition, it is acceptable to provide a unit that displays a print preview on a display device of the device X 310 prior to printing and allows the user X 312 to select whether or not printing is possible.

In step S318, the cloud service 360 and the device X 310 execute cloud printing in cooperation.

Figure 8:
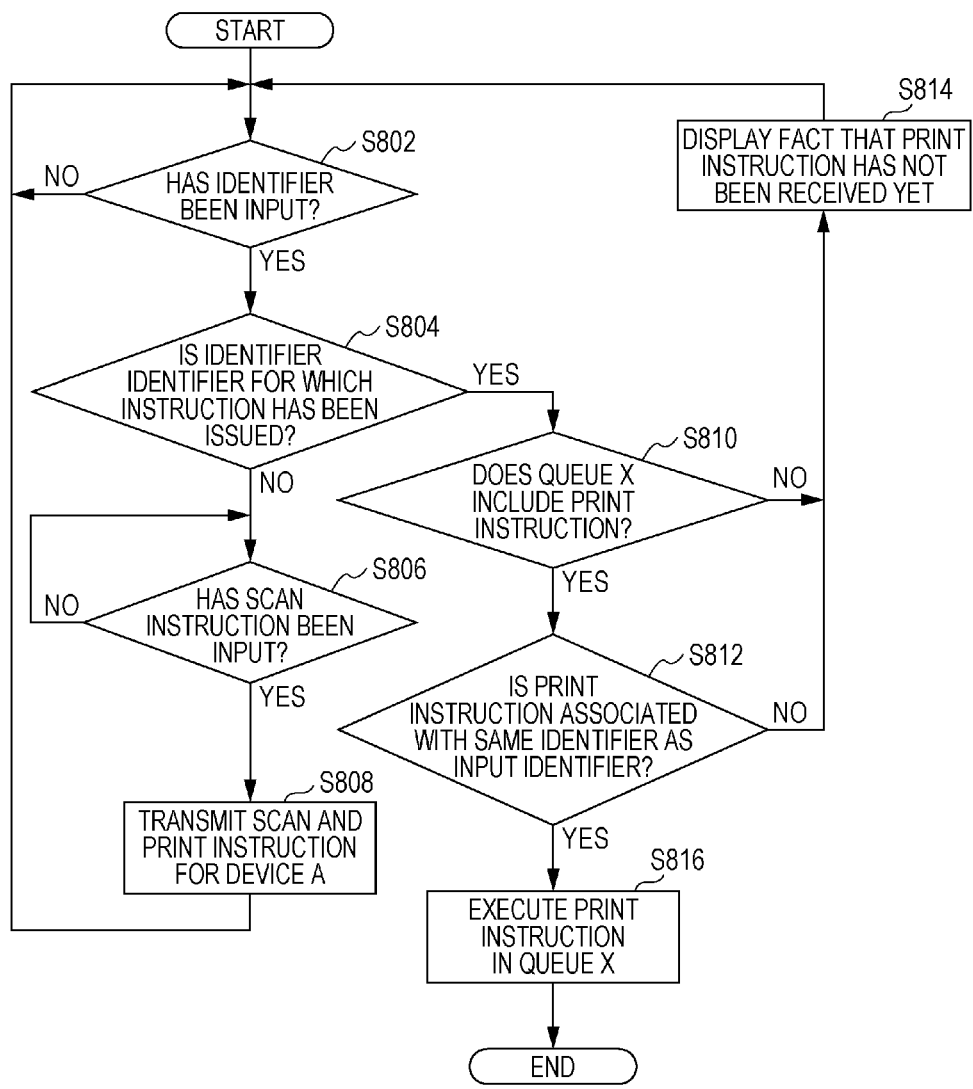
FIG. 8 is a flowchart illustrating a process example according to the exemplary embodiment.

FIG. 8 is a flowchart illustrating a process example according to the exemplary embodiment (the device X 310 in the example of FIG. 3).

In step S802, it is determined whether or not an identifier has been input. If the identifier has been input, the process proceeds to step S804; if not, the device X 310 waits for the identifier to be input.

In step S804, it is determined whether or not the identifier is an identifier for which an instruction has been issued. If the identifier is the identifier for which an instruction has been issued, the process proceeds to step S810; if not, the process proceeds to step S806.

In step S806, it is determined whether or not a scan instruction has been input. If the scan instruction has been input, the process proceeds to step S808; if not, the device X 310 waits for the scan instruction to be input.

In step S808, the device X 310 transmits a scan and print instruction for the device A 300, and the process returns to step S802.

In step S810, it is determined whether or not a queue X includes a print instruction. If the queue X includes the print instruction, the process proceeds to step S812; if not, the process proceeds to step S814.

In step S812, it is determined whether or not the print instruction is associated with the same identifier as the input identifier. If the print instruction is associated with the same identifier as the input identifier, the process proceeds to step S816; if not, the process proceeds to step S814.

In step S814, the device X 310 displays the fact that the print instruction has not been received yet, and the process returns to step S802.

In step S816, the print instruction in the queue X is executed.

Figure 9:
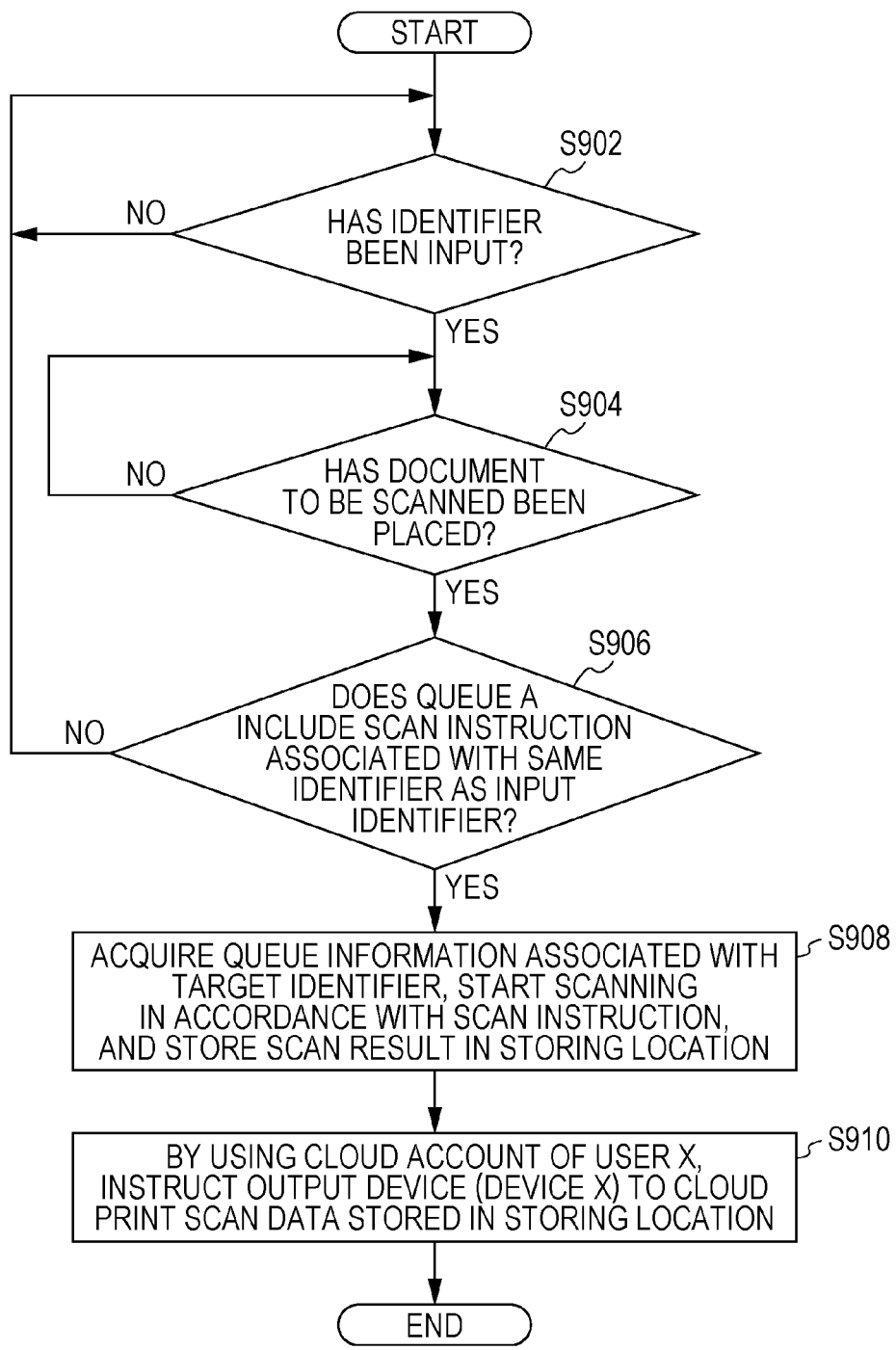
FIG. 9 is a flowchart illustrating a process example according to the exemplary embodiment.

FIG. 9 is a flowchart illustrating a process example according to the embodiment (the device A 300 in the example of FIG. 3).

In step S902, it is determined whether or not an identifier has been input. If the identifier has been input, the process proceeds to step S904; if not, the device A 300 waits for the identifier to be input.

In step S904, it is determined whether or not a document to be scanned has been placed. If the document has been placed, the process proceeds to step S906; if not, the device A 300 waits for the document to be placed.

In step S906, it is determined whether or not the queue A includes a scan instruction associated with the same identifier as the input identifier. If the queue A includes the scan instruction associated with the same identifier as the input identifier, the process proceeds to step S908; if not, the process returns to step S902.

In step S908, queue information associated with the target identifier is acquired, scanning is started in accordance with the scan instruction, and the scan result is stored in a storing location.

In step S910, by using a cloud account of the user X (the user X 312), the device A 300 instructs the output device (the device X 310) to cloud print the scan data stored in the storing location.

Figure 10:
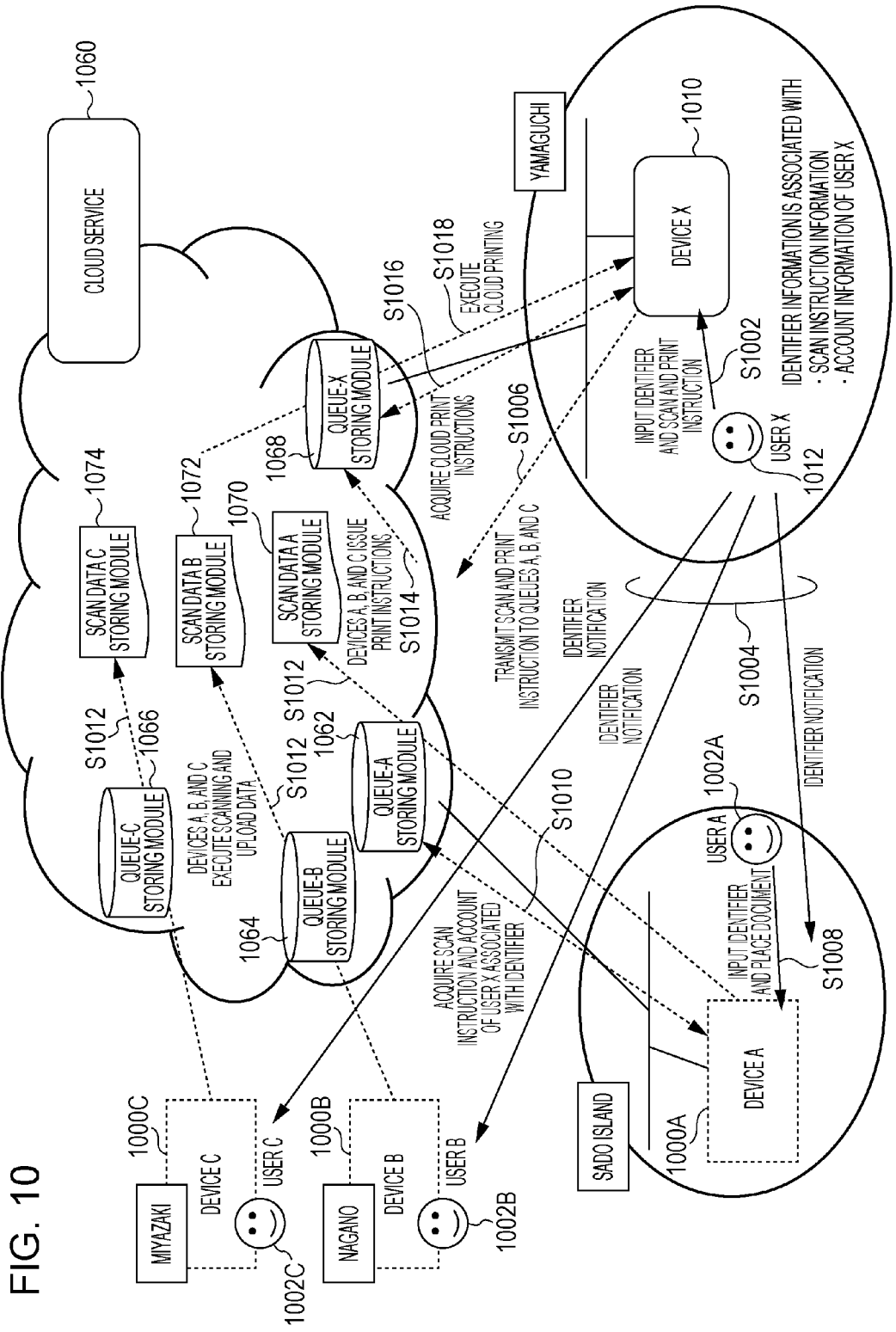
FIG. 10 illustrates a second process example according to the exemplary embodiment.

FIG. 10 illustrates a second process example according to the exemplary embodiment. A device A 1000A, a device B 1000B, and a device C 1000C each corresponding to the image processing device 100, a cloud service 1060 corresponding to the cloud server 250, and a device X 1010 corresponding to the image processing device 200 (having a printing function) are connected to one another via a communication line. This example illustrates the case where plural persons (a user A 1002A, a user B 1002B, and a user C 1002C in this example) serve as scan executors. That is, this example illustrates the case where the device X 1010 and the set of the device A 1000A, the device B 1000B, and the device C 1000C have a one-to-N(N is 2 or more) correspondence relationship.

In step S1002, the device X 1010 receives an identifier and a scan and print instruction (corresponding to processing information) in accordance with an operation performed by a user X 1012. An example of the scan and print instruction is an instruction information table 1200. FIG. 12 illustrates a data structure example of the instruction information table 1200. The instruction information table 1200 includes plural scan executing device fields corresponding to the scan executing device field 640 in the instruction information table 600 illustrated in the example of FIG. 6. The instruction information table 1200 includes an identifier field 1210, a scan instruction information field 1220, scan executing device fields 1240, and a cloud information field 1250. The scan instruction information field 1220 includes a scan size field 1222, a color/monochrome field 1224, a resolution field 1226, a document-type field 1228, an instruction-type field 1230, and a printing device field 1232. The cloud information field 1250 includes a scan client cloud account field 1252 and a scan image storing location field 1254. The identifier field 1210 stores the identifier. The scan instruction information field 1220 stores scan instruction information. The scan size field 1222 stores a scan size. The color/monochrome field 1224 stores information regarding color/monochrome specification. The resolution field 1226 stores a resolution. The document-type field 1228 stores a document type. The instruction-type field 1230 stores the type of an instruction to be executed. The printing device field 1232 stores information regarding a printing device. The scan executing device fields 1240 store information regarding scan executing devices. The cloud information field 1250 stores cloud information. The scan client cloud account field 1252 stores a scan client's cloud account. The scan image storing location field 1254 stores information regarding a scan image storing location.

Figure 11:
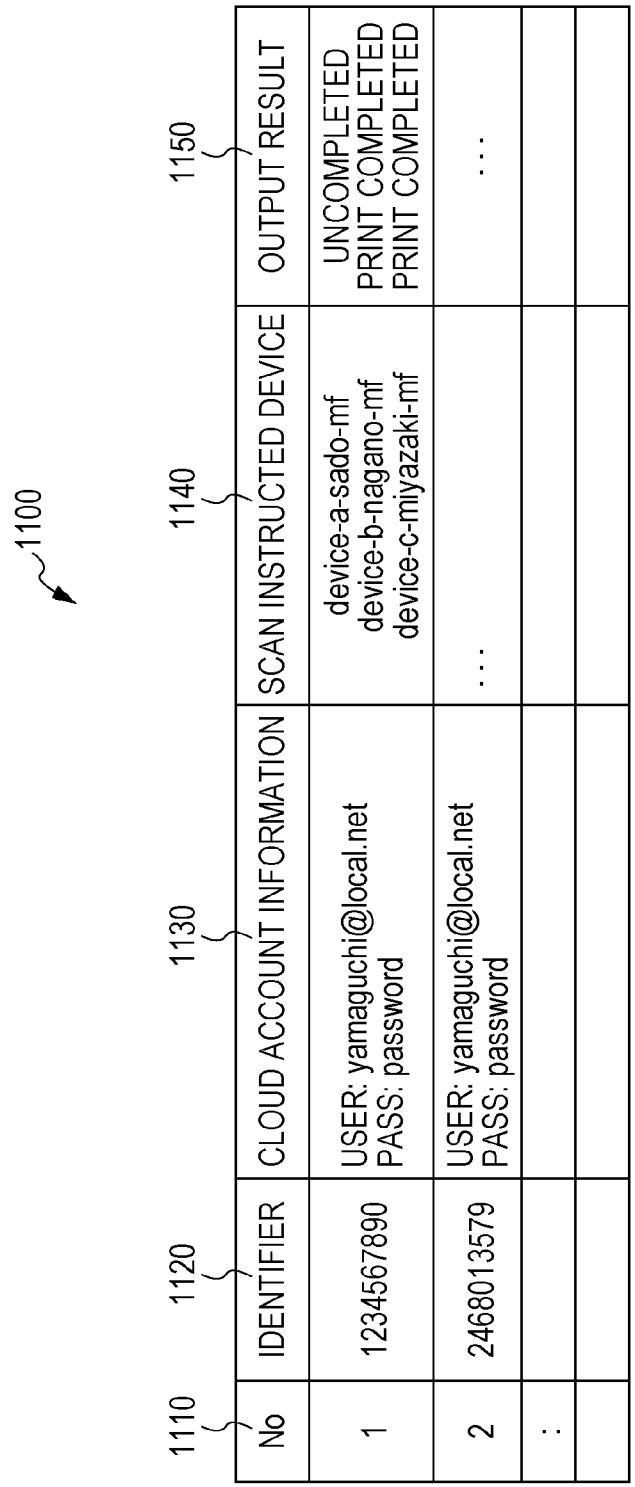
FIG. 11 illustrates a data structure example of a device-X register information table.

Referring back to FIG. 10, in addition, in step S1002, the device X 1010 stores the identifier and account information or the like of the user X 1012 in the cloud service 1060 in association with each other. For example, the device X 1010 stores a device-X register information table 1100. FIG. 11 illustrates a data structure example of the device-X register information table 1100. The device-X register information table 1100 includes a No field 1110, an identifier field 1120, a cloud account information field 1130, a scan instructed device field 1140, and an output result field 1150. The No field 1110 stores numbers (Nos). The identifier field 1120 stores the identifier created in step S1002 (corresponding to the identifier field 1210 in the instruction information table 1200). The cloud account information field 1130 stores account information used in the cloud service 1060. The scan instructed device field 1140 stores information regarding scan executing devices according to the instruction information table 1200 (specifically, the scanners according to the scan executing device fields 1240) associated with the identifier. In this example, the scan executing devices are plural. The output result field 1150 stores output result statuses (e.g., "print completed" or "uncompleted") in the instruction information table 1200 associated with the identifier (specifically, the printer according to the printing device field 1232). The output result statuses are stored for each of the scan instructed devices according to the scan instructed device field 1140.

Referring back to FIG. 10, in step S1004, the user X 1012 notifies the user A 1002A, the user B 1002B, and the user C 1002C of the identifier. For example, the notification may be over the telephone.

In step S1006, the device X 1010 transmits the identifier and the scan and print instruction (the instruction information table 1200) to the cloud service 1060. In the cloud service 1060, the instruction information table 1200 is caused to be stored in a queue-A storing module 1062, a queue-B storing module 1064, and a queue-C storing module 1066, which respectively correspond to the device A 1000A, the device B 1000B, and the device C 1000C.

Either of step S1004 and step S1006 may be performed earlier than the other.

In step S1008, the device A 1000A receives the identifier in accordance with an operation performed by the user A 1002A. Then, a document is placed. The device B 1000B also receives the identifier in accordance with an operation performed by the user B 1002B. Then, a document is placed. The device C 1000C also receives the identifier in accordance with an operation performed by the user C 1002C. Then, a document is placed.

In step S1010, each of the device A 1000A, the device B 1000B, and the device C 1000C acquires, from the cloud service 1060, the instruction information table 1200 (including the scan instruction information, the account information of the user X 1012, and other information) associated with the identifier.

In step S1012, each of the device A 1000A, the device B 1000B, and the device C 1000C reads the corresponding document and uploads the obtained scan image to the cloud service 1060. The cloud service 1060 stores the respective scan images in a scan data A storing module 1070, a scan data B storing module 1072, and a scan data C storing module 1074.

In step S1014, each of the device A 1000A, the device B 1000B, and the device C 1000C instructs the cloud service 1060 to cloud print the respective scan images by using the account of the user X 1012.

In step S1016, the device X 1010 acquires the cloud print instructions from the cloud service 1060.

In step S1018, the cloud service 1060 and the device X 1010 execute cloud printing in cooperation. In accordance with the cloud print instructions, the device X 1010 acquires a scan image A, a scan image B, and a scan image C respectively from the scan data A storing module 1070, the scan data B storing module 1072, and the scan data C storing module 1074 in the cloud service 1060, and prints the scan image A, the scan image B, and the scan image C.

Note that the device X 1010 may output the scan image A, the scan image B, and the scan image C in the order cloud print instructions therefor are received, or may include a unit that performs control in such a manner that the scan image A, the scan image B, and the scan image C are output after waiting for a queue-X storing module 1068 to receive all of the cloud print instructions for the scan image A, the scan image B, and the scan image C.

In the latter case, the device X 1010 may include a unit that waits for the scan image A, the scan image B, and the scan image C (the number of scan images is equal to the number of scan executing devices) to be stored and that outputs the scan images A, B, and C collectively as a single document (one-time print processing). In addition, if all of the cloud print instructions are not received within a first predetermined period, only scan images for which cloud print instructions are received after a second predetermined period has passed (after time-out) may be output. In this case, upon each cloud print instruction, the corresponding scan image may be output. Alternatively, scan images for which cloud print instructions have been received may be collectively printed as a single document.

The device X 1010 may also include a unit that notifies the user X 1012 of the reception of all of the cloud print instructions by using email or the like upon reception of all of the cloud print instructions.

The device X 1010 may also include a unit that performs the following operation. In the case where the device X 1010 receives an identifier again through an operation performed by the user X 1012 after step S1002, if all of the scan image A, the scan image B, and the scan image C has not been stored yet, the unit displays this fact and prompts waiting. Alternatively, only scan images that have already been stored may be printed.

Figure 13:
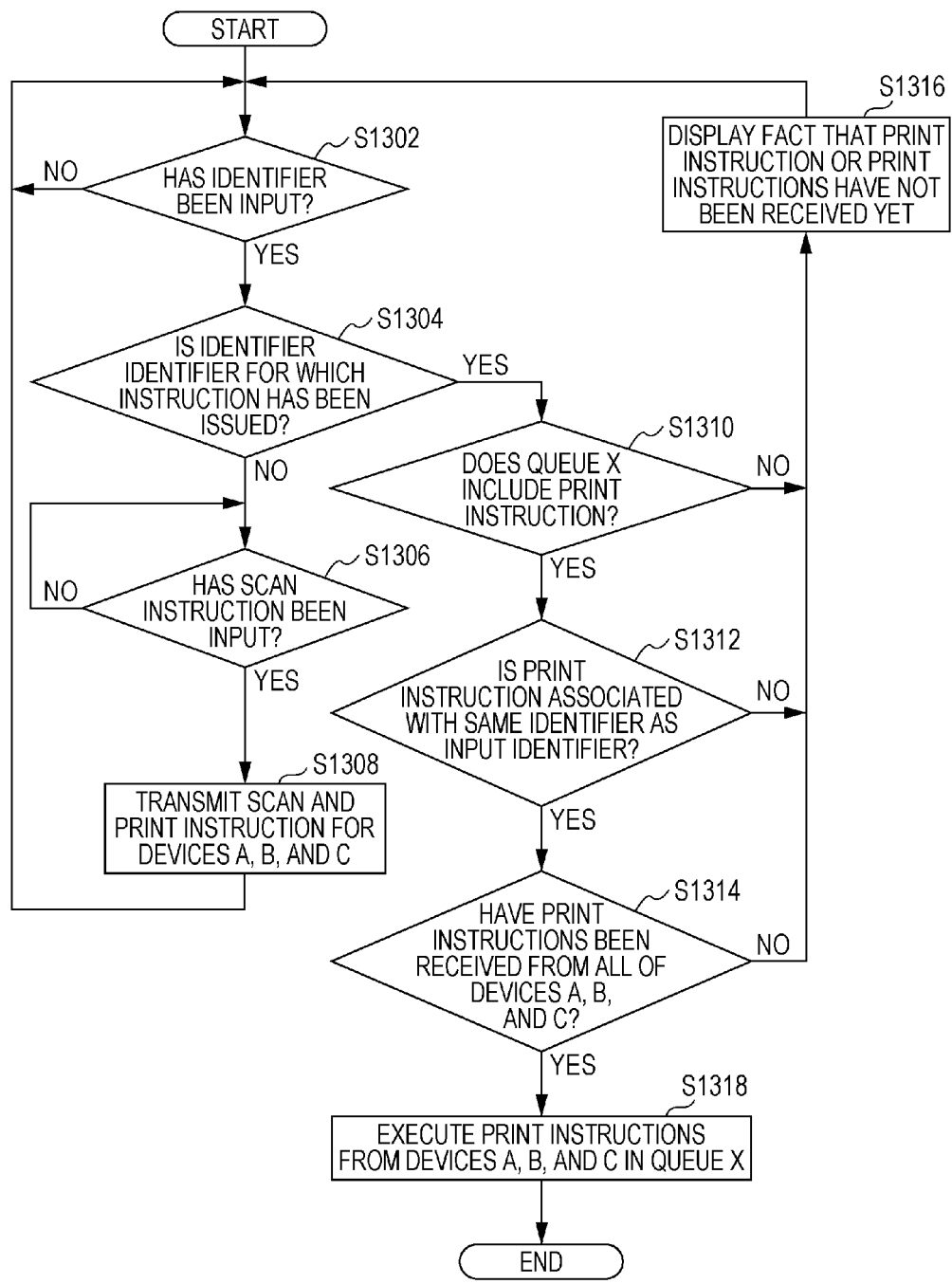
FIG. 13 is a flowchart illustrating a process example according to the exemplary embodiment.

FIG. 13 is a flowchart illustrating a process example according to the exemplary embodiment (the device X 1010 in the example of FIG. 10).

In step S1302, it is determined whether or not an identifier has been input. If the identifier has been input, the process proceeds to step S1304; if not, the device X 1010 waits for the identifier to be input.

In step S1304, it is determined whether or not the identifier is an identifier for which an instruction has been issued. If the identifier is the identifier for which an instruction has been issued, the process proceeds to step S1310; if not, the process proceeds to step S1306.

In step S1306, it is determined whether or not a scan instruction has been input. If the scan instruction has been input, the process proceeds to step S1308; if not, the device X 1010 waits for the scan instruction to be input.

In step S1308, the device X 1010 transmits a scan and print instruction for the device A 1000A, the device B 1000B, and the device C 1000C.

In step S1310, it is determined whether or not a queue X includes a print instruction. If the queue X includes the print instruction, the process proceeds to step S1312; if not, the process proceeds to step S1316.

In step S1312, it is determined whether or not the print instruction is associated with the same identifier as the input identifier. If the print instruction is associated with the same identifier as the input identifier, the process proceeds to step S1314; if not, the process proceeds to step S1316.

In step S1314, it is determined whether or not print instructions have been received from all of the device A 1000A, the device B 1000B, and the device C 1000C. If print instructions have been received from all of the device A 1000A, the device B 1000B, and the device C 1000C, the process proceeds to step S1318; if not, the process proceeds to step S1316.

In step S1316, the device X 1010 displays the fact that the print instruction or print instructions have not been received yet, and the process returns to step S1302.

In step S1318, the print instructions from the device A 1000A, the device B 1000B, and the device C 1000C in the queue X are executed.

Figure 14:
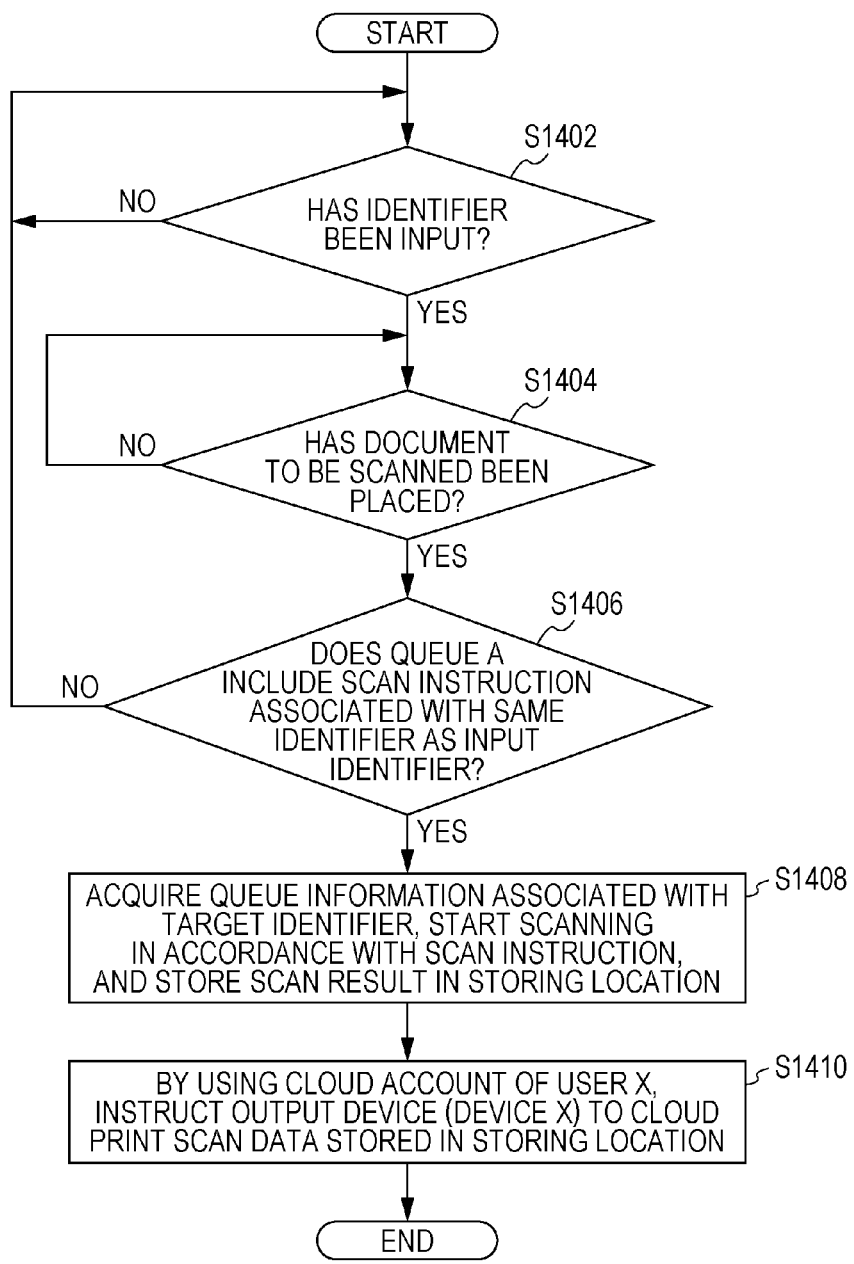
FIG. 14 is a flowchart illustrating a process example according to the exemplary embodiment.

FIG. 14 is a flowchart illustrating a process example according to the embodiment (each of the device A 1000A, the device B 1000B, and the device C 1000C in the example of FIG. 10, hereinafter referred to as a device 1000). This flowchart is similar to the flowchart illustrated in the example of FIG. 9.

In step S1402, it is determined whether or not an identifier has been input. If the identifier has been input, the process proceeds to step S1404; if not, the device 1000 waits for the identifier to be input.

In step S1404, it is determined whether or not a document to be scanned has been placed. If the document has been placed, the process proceeds to step S1406; if not, the device 1000 waits for the document to be placed.

In step S1406, it is determined whether or not the queue A includes a scan instruction associated with the same identifier as the input identifier. If the queue A includes the scan instruction associated with the same identifier as the input identifier, the process proceeds to step S1408; if not, the process returns to step S1402.

In step S1408, queue information associated with the target identifier is acquired, scanning is started in accordance with the scan instruction, and the scan result is stored in a storing location.

In step S1410, by using a cloud account of the user X (the user X 1012), the device 1000 instructs the output device (the device X 1010) to cloud print the scan data stored in the storing location.

Figure 15:
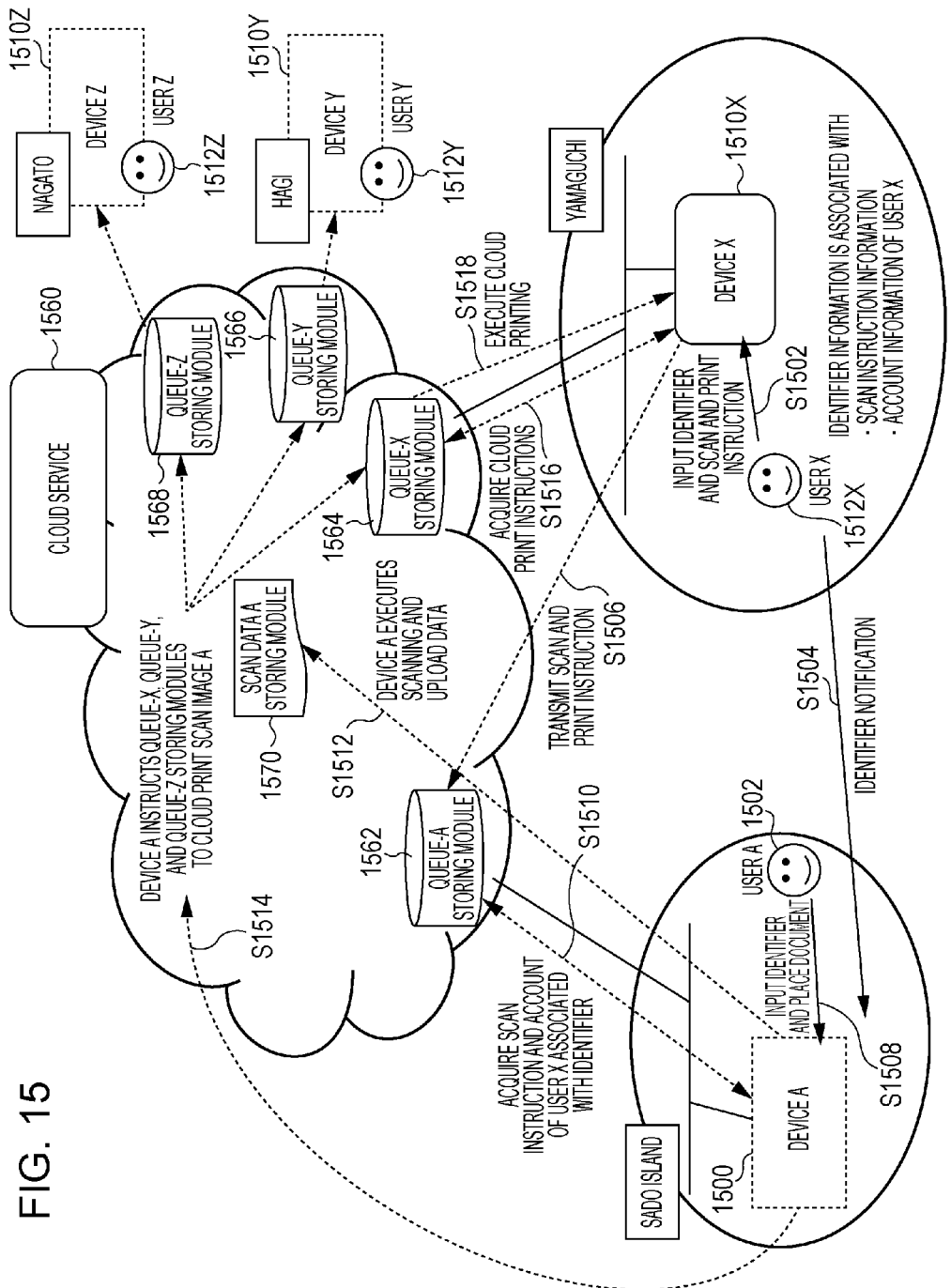
FIG. 15 illustrates a third process example according to the exemplary embodiment.

FIG. 15 illustrates a third process example according to the exemplary embodiment. A device A 1500 corresponding to the image processing device 100, a cloud service 1560 corresponding to the cloud server 250, and a device X 1510X, a device Y 1510Y, and a device Z 1510Z each corresponding to the image processing device 200 (having a printing function) are connected to one another via a communication line. This example illustrates the case where plural persons (a user X 1512X, a user Y 1512Y, and a user Z 1512Z in this example) obtain a printed material. That is, this example illustrates the case where the set of the device X 1510X, the device Y 1510Y, and the device Z 1510Z and the device A 1500 have an M-to-1 (M is 2 or more) correspondence relationship. In this example, the device X 1510X issues scan instructions, and the device X 1510X, the device Y 1510Y, and the device Z 1510Z print the respective scan images.

In step S1502, the device X 1510X receives an identifier and a scan and print instruction (corresponding to processing information) in accordance with an operation performed by the user X 1512X. An example of the scan and print instruction is an instruction information table 1600. FIG. 16 illustrates a data structure example of the instruction information table 1600. The instruction information table 1600 includes plural printing device fields corresponding to the printing device field 632 of the instruction information table 600 illustrated in the example of FIG. 6. The instruction information table 1600 includes an identifier field 1610, a scan instruction information field 1620, a scan executing device field 1640, and a cloud information field 1650. The scan instruction information field 1620 includes a scan size field 1622, a color/monochrome field 1624, a resolution field 1626, a document-type field 1628, an instruction-type field 1630, and a printing device field 1632. The cloud information field 1650 includes a scan client cloud account field 1652 and a scan image storing location field 1654. The identifier field 1610 stores the identifier. The scan instruction information field 1620 stores scan instruction information. The scan size field 1622 stores a scan size. The color/monochrome field 1624 stores information regarding color/monochrome specification. The resolution field 1626 stores a resolution. The document-type field 1628 stores a document type. The instruction-type field 1630 stores the type of an instruction to be executed. The printing device fields 1632 store information regarding printing devices. The scan executing device field 1640 stores information regarding a scan executing device. The cloud information field 1650 stores cloud information. The scan client cloud account field 1652 stores a scan client's cloud account. The scan image storing location field 1654 stores information regarding a scan image storing location.

Referring back to FIG. 15, in step S1504, the user X 1512X notifies a user A 1502 of the identifier. For example, the notification may be over the telephone.

In step S1506, the device X 1510X transmits the identifier and the scan and print instruction (the instruction information table 1600) to the cloud service 1560. In the cloud service 1560, the instruction information table 1600 is caused to be stored in a queue-A storing module 1562.

Either of step S1504 and step S1506 may be performed earlier than the other.

In step S1508, the device A 1500 receives the identifier in accordance with an operation performed by the user A 1502. Then, a document is placed.

In step S1510, the device A 1500 acquires, from the cloud service 1560, the instruction information table 1600 (including the scan instruction information, the account information of the user X 1512X, and other information) associated with the identifier.

In step S1512, the device A 1500 reads the document and uploads the obtained scan image to the cloud service 1560. The cloud service 1560 stores the scan image in a scan data A storing module 1570.

In step S1514, by using the account of the user X 1512X, the device A 1500 instructs the cloud service 1560 to cloud print the scan image. In this case, the device X 1510X, the device Y 1510Y, and the device Z 1510Z execute printing.

In step S1516, the device X 1510X, the device Y 1510Y, and the device Z 1510Z acquire cloud print instructions respectively from a queue-X storing module 1564, a queue-Y storing module 1566, and a queue-Z storing module 1568 in the cloud service 1560.

In step S1518, the cloud service 1560, the device X 1510X, the device Y 1510Y, and the device Z 1510Z execute cloud printing in cooperation.

Figure 17:
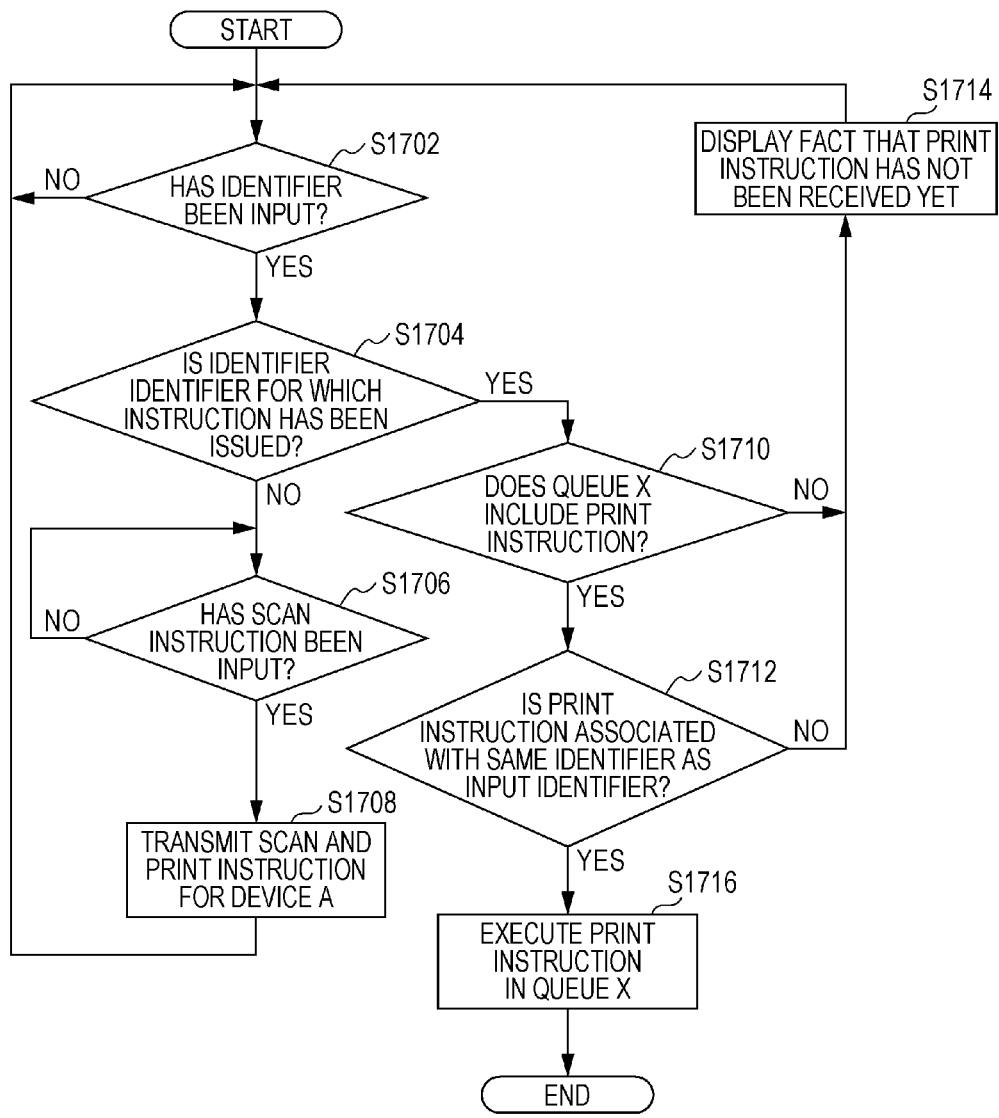
FIG. 17 is a flowchart illustrating a process example according to the exemplary embodiment.

FIG. 17 is a flowchart illustrating a process example according to the exemplary embodiment (each of the device X 1510X, the device Y 1510Y, and the device Z 1510Z, hereinafter referred to as a device 1510 in the example of FIG. 15). This flowchart is similar to the flowchart illustrated in the example of FIG. 8.

In step S1702, it is determined whether or not an identifier has been input. If the identifier has been input, the process proceeds to step S1704; if not, the device 1510 waits for the identifier to be input.

In step S1704, it is determined whether or not the identifier is an identifier for which an instruction has been issued. If the identifier is the identifier for which an instruction has been issued, the process proceeds to step S1710; if not, the process proceeds to step S1706.

In step S1706, it is determined whether or not a scan instruction has been input. If the scan instruction has been input, the process proceeds to step S1708; if not, the device 1510 waits for the scan instruction to be input.

In step S1708, the device 1510 transmits a scan and print instruction for the device A (the device A 1500), and the process returns to step S1702.

In step S1710, it is determined whether or not a queue X includes a print instruction. If the queue X includes the print instruction, the process proceeds to step S1712; if not, the process proceeds to step S1714.

In step S1712, it is determined whether or not the print instruction is associated with the same identifier as the input identifier. If the print instruction is associated with the same identifier as the input identifier, the process proceeds to step S1716; if not, the process proceeds to step S1714.

In step S1714, the device 1510 displays the fact that the print instruction has not been received yet, and the process returns to step S1702.

In step S1716, the print instruction in the queue X is executed.

Figure 18:
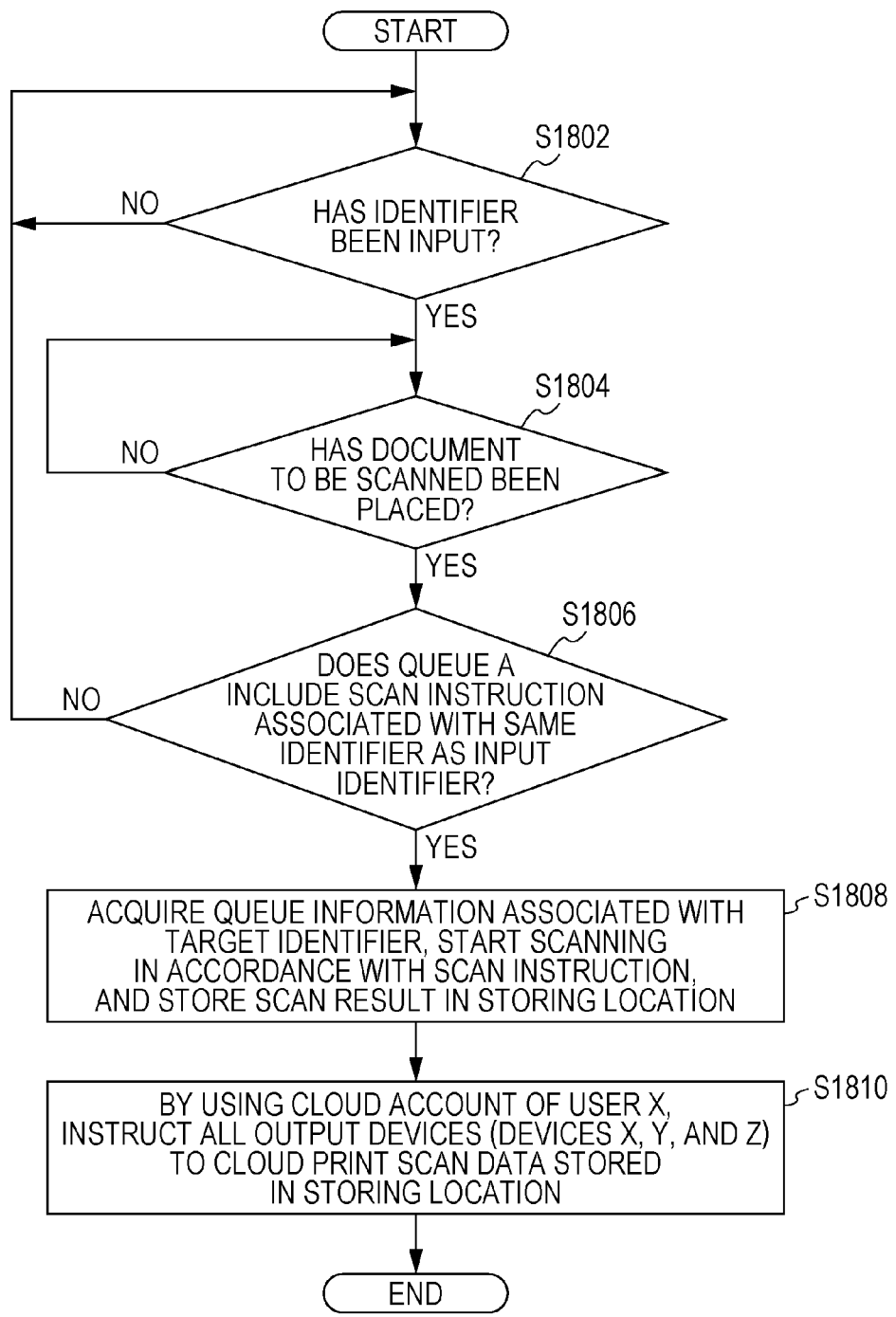
FIG. 18 is a flowchart illustrating a process example according to the exemplary embodiment.

FIG. 18 is a flowchart illustrating a process example according to the embodiment (the device A 1500 in the example of FIG. 15).

In step S1802, it is determined whether or not an identifier has been input. If the identifier has been input, the process proceeds to step S1804; if not, the device A 1500 waits for the identifier to be input.

In step S1804, it is determined whether or not a document to be scanned has been placed. If the document has been placed, the process proceeds to step S1806; if not, the device A 1500 waits for the document to be placed.

In step S1806, it is determined whether or not the queue A includes a scan instruction associated with the same identifier as the input identifier. If the queue A includes the scan instruction associated with the same identifier as the input identifier, the process proceeds to step S1808; if not, the process returns to step S1802.

In step S1808, queue information associated with the target identifier is acquired, scanning is started in accordance with the scan instruction, and the scan result is stored in a storing location.

In step S1810, by using a cloud account of the user X (the user X 1512X), the device A 1500 instructs all of the output devices (the device X 1510X, the device Y 1510Y, and the device Z 1510Z) to cloud print the scan data in the storing location.

FIG. 19 illustrates a fourth process example according to the exemplary embodiment. A device A 1900A, a device B 1900B, and a device C 1900C each corresponding to the image processing device 100, a cloud service 1960 corresponding to the cloud server 250, and a device X 1910X, a device Y 1910Y, and a device Z 1910Z each corresponding to the image processing device 200 (having a printing function) are connected to one another via a communication line. This example illustrates the case where plural persons (a user A 1902A, a user B 1902B, and a user C 1902C in this example) serve as scan executors and where plural persons (a user X 1912X, a user Y 1912Y, and a user Z 1912Z in this example) obtain a printed material. That is, this example illustrates the case where the set of the device X 1910X, the device Y 1910Y, and the device Z 1910Z and the set of the device A 1900A, the device B 1900B, and the device C 1900C have an M-to-N (M and N are each 2 or more) correspondence relationship. In this example, the device X 1910X issues scan instructions, and the device X 1910X, the device Y 1910Y, and the device Z 1910Z print the respective scan images.

In step S1902, the device X 1910X receives an identifier and a scan and print instruction (corresponding to processing information) in accordance with an operation performed by the user X 1912X. An example of the scan and print instruction is an instruction information table 2000. FIG. 20 illustrates a data structure example of the instruction information table 2000. The instruction information table 2000 includes plural printing device fields corresponding to the printing device field 632 in the instruction information table 600 illustrated in the example of FIG. 6 and includes plural scan executing device fields corresponding to the scan executing device field 640 therein. The instruction information table 2000 includes an identifier field 2010, a scan instruction information field 2020, scan executing device fields 2040, and a cloud information field 2050. The scan instruction information field 2020 includes a scan size field 2022, a color/monochrome field 2024, a resolution field 2026, a document-type field 2028, an instruction-type field 2030, and printing device fields 2032. The cloud information field 2050 includes a scan client cloud account field 2052 and a scan image storing location field 2054. The identifier field 2010 stores the identifier. The scan instruction information field 2020 stores scan instruction information. The scan size field 2022 stores a scan size. The color/monochrome field 2024 stores information regarding color/monochrome specification. The resolution field 2026 stores a resolution. The document-type field 2028 stores a document type. The instruction-type field 2030 stores the type of an instruction to be executed. The printing device fields 2032 store information regarding printing devices. The scan executing device fields 2040 store information regarding scan executing devices. The cloud information field 2050 stores cloud information. The scan client cloud account field 2052 stores a scan client's cloud account. The scan image storing location field 2054 stores information regarding a scan image storing location.

Referring back to FIG. 19, in step S1904, the user X 1912X notifies the user A 1902A, the user B 1902B, and the user C 1902C of the identifier. For example, the notification may be over the telephone.

In step S1906, the device X 1910X transmits the identifier and the scan and print instruction (the instruction information table 2000) to the cloud service 1960. In the cloud service 1960, the instruction information table 2000 is caused to be stored in a queue-A storing module 1962, a queue-B storing module 1964, and a queue-C storing module 1966, which respectively correspond to the device A 1900A, the device B 1900B, and the device C 1900C.

Either of step S1904 and step S1906 may be performed earlier than the other.

In step S1908, the device A 1900A receives the identifier in accordance with an operation performed by the user A 1902A. Then, a document is placed. The device B 1900B also receives the identifier in accordance with an operation performed by the user B 1902B. Then, a document is placed. The device C 1900C also receives the identifier in accordance with an operation performed by the user C 1902C. Then, a document is placed.

In step S1910, each of the device A 1900A, the device B 1900B, and the device C 1900C acquires, from the cloud service 1960, the instruction information table 2000 (including the scan instruction information, the account information of the user X 1912X, and other information) associated with the identifier.

In step S1912, each of the device A 1900A, the device B 1900B, and the device C 1900C reads the corresponding document and uploads the obtained scan image to the cloud service 1960. The cloud service 1960 stores the respective scan images in a scan data A storing module 1974, a scan data B storing module 1976, and a scan data C storing module 1978.

In step S1914, by using the account of the user X 1912X, each of the device X 1910X, the device Y 1910Y, and the device Z 1910Z instructs the cloud service 1960 to cloud print the corresponding scan image. In this case, the device X 1910X, the device Y 1910Y, and the device Z 1910Z execute printing.

In step S1916, the device X 1910X, the device Y 1910Y, and the device Z 1910Z acquire cloud print instructions respectively from a queue-X storing module 1968, a queue-Y storing module 1970, and a queue-Z storing module 1972 in the cloud service 1960.

In step S1918, the cloud service 1960, the device X 1910X, the device Y 1910Y, and the device Z 1910Z execute cloud printing in cooperation.

FIG. 21 is a flowchart illustrating a process example according to the exemplary embodiment (each of the device X 1910X, the device Y 1910Y, and the device Z 1910Z in the example of FIG. 19, hereinafter referred to as a device 1910). This flowchart is similar to the flowchart illustrated in the example of FIG. 13.

In step S2102, it is determined whether or not an identifier has been input. If the identifier has been input, the process proceeds to step S2104; if not, the device 1910 waits for the identifier to be input.

In step S2104, it is determined whether or not the identifier is an identifier for which an instruction has been issued. If the identifier is the identifier for which an instruction has been issued, the process proceeds to step S2110; if not, the process proceeds to step S2106.

In step S2106, it is determined whether or not a scan instruction has been input. If the scan instruction has been input, the process proceeds to step S2108; if not, the device 1910 waits for the scan instruction to be input.

In step S2108, the device 1910 transmits a scan and print instruction for the device A 1900A, the device B 1900B, and the device C 1900C.

In step S2110, it is determined whether or not a queue X includes a print instruction. If the queue X includes the print instruction, the process proceeds to step S2112; if not, the process proceeds to step S2116.

In step S2112, it is determined whether or not the print instruction is associated with the same identifier as the input identifier. If the print instruction is associated with the same identifier as the input identifier, the process proceeds to step S2114; if not, the process proceeds to step S2116.

In step S2114, it is determined whether or not print instructions have been received from all of the device A 1900A, the device B 1900B, and the device C 1900C. If print instructions have been received from all of the device A 1900A, the device B 1900B, and the device C 1900C, the process proceeds to step S2118; if not, the process proceeds to step S2116.

In step S2116, the device 1910 displays the fact that the print instruction or print instructions have not been received yet, and the process returns to step S2102.

In step S2118, the print instructions from the device A 1900A, the device B 1900B, and the device C 1900C in the queue X are executed.

FIG. 22 is a flowchart illustrating a process example according to the embodiment (the device 1910 in the example of FIG. 19). This flowchart is similar to the flowchart illustrated in the example of FIG. 18.

In step S2202, it is determined whether or not an identifier has been input. If the identifier has been input, the process proceeds to step S2204; if not, the device 1910 waits for the identifier to be input.

In step S2204, it is determined whether or not a document to be scanned has been placed. If the document has been placed, the process proceeds to step S2206; if not, the device 1910 waits for the document to be placed.

In step S2206, it is determined whether or not the queue A includes a scan instruction associated with the same identifier as the input identifier. If the queue A includes the scan instruction associated with the same identifier as the input identifier, the process proceeds to step S2208; if not, the process returns to step S2202.

In step S2208, queue information associated with the target identifier is acquired, scanning is started in accordance with the scan instruction, and the scan result is stored in a storing location.

In step S2210, by using a cloud account of the user X (the user X 1912X), the device 1910 instructs all of the output devices (the device X 1910X the device Y 1910Y, and the device Z 1910Z) to cloud print the scan data in the storing location.

Figure 23:
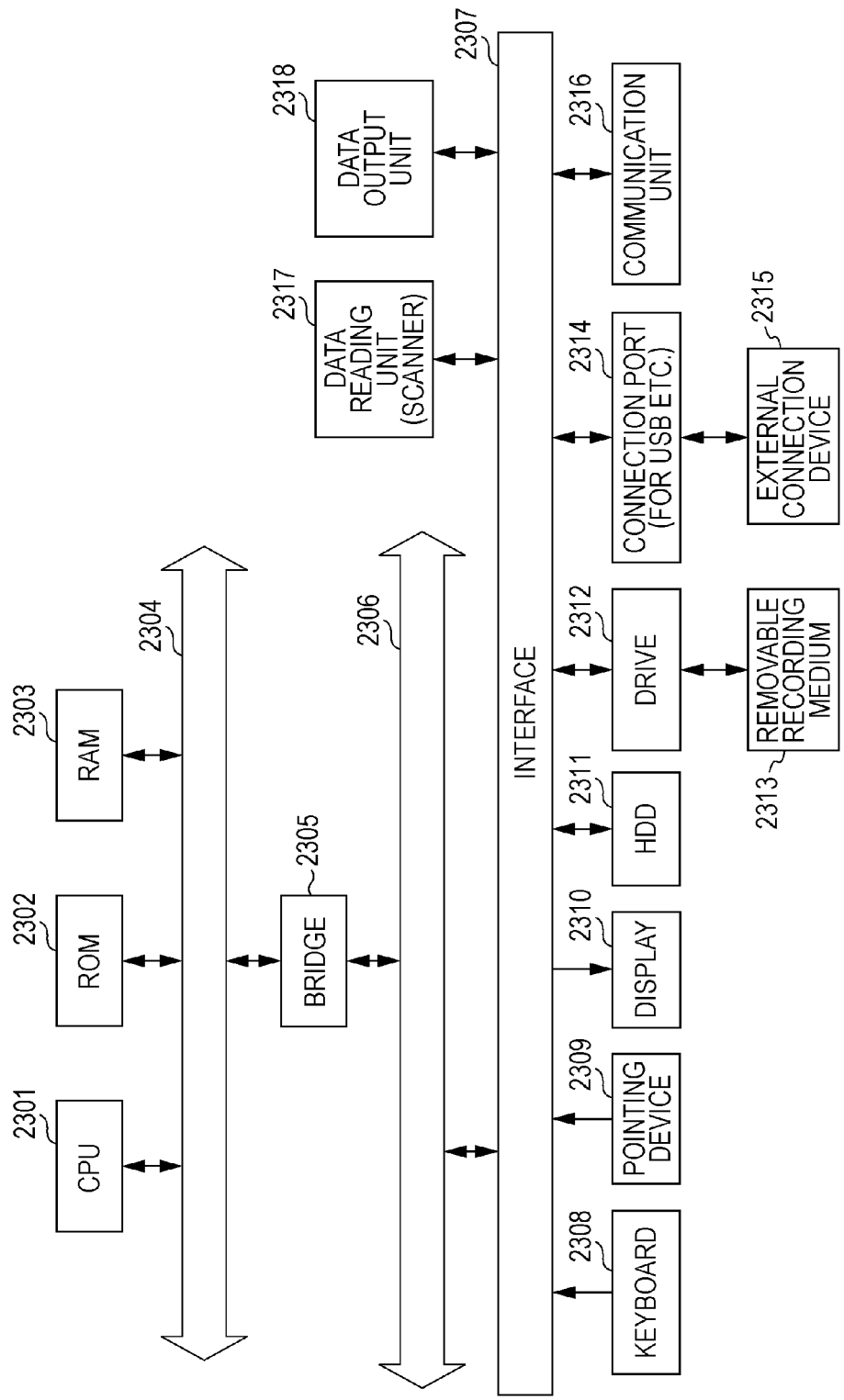
FIG. 23 is a block diagram illustrating a hardware configuration example of a computer realizing the exemplary embodiment.

A hardware configuration example of an image processing device according to the exemplary embodiment will be described with reference to FIG. 23. The configuration illustrated in FIG. 23 is a hardware configuration example that is realized by, for example, a personal computer (PC) and that includes a data reading unit 2317, such as a scanner, and a data output unit 2318, such as a printer.

A central processing unit (CPU) 2301 is a control unit that executes processes in accordance with computer programs that describe sequences of executing the modules described above in the exemplary embodiment, in other words, the following modules: the scan instruction executing module 120, the reception module 130, the acquisition module 140, the setting module 150, the transmission module 160, the notification module 170, the communication module 180, and the like.

A read only memory (ROM) 2302 stores programs, operating parameters, and the like used by the CPU 2301. A random access memory (RAM) 2303 stores programs used in the execution of the CPU 2301, parameters that change appropriately in the execution, and the like. The CPU 2301, the ROM 2302, and the RAM 2303 are connected to one another via a host bus 2304, such as a CPU bus.

The host bus 2304 is connected to an external bus 2306, such as a peripheral component interconnect/interface (PCI) bus, via a bridge 2305.

A keyboard 2308 and a pointing device 2309, such as a mouse, are devices manipulated by an operator. A display 2310, such as a liquid crystal display device or a cathode ray tube (CRT), displays various kinds of information as text or image information. The display 2310 may be a touch screen, for example, having the functions of both the pointing device 2309 and the display 2310.

A hard disk drive (HDD) 2311 includes a built-in hard disk (a flash memory or the like is also possible) and drives and causes the hard disk to record or reproduce information and programs executed by the CPU 2301. The hard disk stores a scan image, processing information (including scan parameters, information regarding an image storing location, and information regarding an image printing device), and the like. Furthermore, the hard disk also stores other various kinds of data, various computer programs, and the like.

A drive 2312 reads data or programs recorded on a removable recording medium 2313, such as a loaded magnetic disk, optical disc, magneto-optical disk, or semiconductor memory, and supplies the data or programs to the RAM 2303 connected to the drive 2312 via an interface 2307, the external bus 2306, the bridge 2305, and the host bus 2304. Note that the removable recording medium 2313 is also usable as a data recording region.

A connection port 2314 is a port to be connected to an external connection device 2315 and includes a connection portion for a USB or IEEE 1394 connector, for example. The connection port 2314 is connected to, for example, the CPU 2301 via the interface 2307, the external bus 2306, the bridge 2305, the host bus 2304, and the like. A communication unit 2316 is connected to a communication line and executes data communication processes with external devices. The data reading unit 2317 is a scanner, for example, and executes a document reading process. The data output unit 2318 is a printer, for example, and performs a document data output process.

The hardware configuration of the image processing device illustrated in FIG. 23 is one of exemplary configurations. The exemplary embodiment is not limited to the configuration illustrated in FIG. 23 and may be any configuration as long as it is possible to execute the modules described in the exemplary embodiment. For example, some modules may be configured by dedicated hardware (e.g., application specific integrated circuit (ASIC)), some modules may be included in an external system and may be connected to the image processing device via a communication line, and plural systems illustrated in FIG. 23 may be connected to one another via a communication line and may operate in cooperation with one another. In particular, some modules may be incorporated in a copying machine, a facsimile, a scanner, a printer, a multifunction peripheral, and the like.

The above-described program may be provided by being stored in a recording medium. Alternatively, the program may be provided by using a communication unit. In such a case, for example, the program may correspond to a computer readable recording medium storing a program.

The term "computer readable recording medium storing a program" refers to a computer readable recording medium that stores a program and that is used to, for example, install, execute, and distribute the program.

Examples of the recording medium include the following: a digital versatile disc (DVD), such as "DVD-R, DVD-RW, DVD-RAM, and the like" as standardized by the DVD Forum or "DVD+R, DVD+RW, and the like" as standardized by the DVD+RW Alliance; a compact disc (CD), such as a CD read only memory (CD-ROM), a CD recordable (CD-R), or a CD rewritable (CD-RW); a Blu-ray Disc (registered trademark); a magneto-optical disk (MO); a flexible disk (FD); a magnetic tape; a hard disk; a read only memory (ROM); an electrically erasable programmable read only memory (EEPROM) (registered trademark); a flash memory; a random access memory (RAM); and a secure digital (SD) memory card.

A part or all of the program may be, for example, recorded on the recording medium and stored or distributed. Alternatively, a part or all of the program may be transmitted by communication using a transmission medium, such as a wired network used for a local area network (LAN), a metropolitan area network (MAN), a wired area network (WAN), the Internet, an intranet, or an extranet; a wireless communication network; or a combination thereof. Further alternatively, a part or all of the program may be transmitted on a carrier wave.

The above-described program may be a part or all of another program, or may be recorded on a recording medium together with another program. The program may be divided into sub-parts and recorded on plural recording media. The program may be recorded in any form, such as by being compressed or encrypted, as long as it is possible to restore the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device for use by a first user to read image data and instruct printing on behalf of a second user, comprising:
 a reception unit that receives a processing identifier of the second user who has previously input the processing identifier into a different device, the processing identifier being associated with image reading processing, the receipt of the processing identifier indicating that the first user is to perform image reading for the second user;
 an acquisition unit that acquires processing information associated with the processing identifier from a cloud service, the processing information including at least information regarding an image reading condition, a storing location of the cloud service, and client's identification information;
 an image reading unit that reads an image on the basis of the image reading condition of the processing information;
 a transmission unit that transmits data of the read image to the storing location of the cloud service according to the processing information; and
 an instruction unit that issues a print instruction to print the image with a printer designated by the second user transmitted to the storing location in response to receipt of the client's identification information included in the processing information.

2. The image processing device according to claim 1, wherein the transmission unit displays the information regarding the storing location prior to transmitting the data of the read image, and transmits the data of the read image to the storing location upon reception of a confirmation operation.

3. The image processing device according to claim 1, wherein the image reading unit displays, upon reception of the processing identifier, information regarding a client according to the processing information associated with the processing identifier, and reads, upon reception of a confirmation operation, the image on the basis of the processing information.

4. An image processing system for use by a first user to read image data and instruct printing on behalf of a second user, comprising:
 an image processing device; and
 an information processing device,
 the image processing device including
  a reception unit that receives a processing identifier of the second user who has previously input the processing identifier into a different device, the processing identifier being associated with image reading processing, the receipt of the processing identifier indicating that the first user is to perform image reading for the second user,
  an acquisition unit that acquires processing information associated with the processing identifier from a cloud service, the processing information including at least information regarding an image reading condition, a storing location of the cloud service, and client's log-in information, an image reading unit that reads an image on the basis of the image reading condition of the processing information, a transmission unit that transmits data of the read image to the information processing device that serves as the storing location of the cloud service according to the processing information, and an instruction unit that logs in to the information processing device by using the client's log-in information according to the processing information and issues a print instruction to print the image with a printer designated by the second user transmitted to the storing location in response to receipt of the client's identification information included in the processing information, the information processing device including a memory that stores the data of the image from the image processing device, a printing controller that performs, upon reception of the print instruction from the image processing device, control in such a manner that the image stored in the memory becomes printable by using a printer according to the processing information.

5. An image processing method for an image processing device for use by a first user to read image data and instruct printing on behalf of a second user, comprising:

receiving with the image processing device a processing identifier of the second user who has previously input the processing identifier into a different device, the processing identifier being associated with image reading processing, the receipt of the processing identifier indicating that the first user is to perform image reading for the second user;

acquiring with the image processing device processing information associated with the processing identifier from a cloud service, the processing information including at least information regarding an image reading condition, a storing location of the cloud service, and client's identification information;

reading with the image processing device an image on the basis of the image reading condition of the processing information;

transmitting with the image processing device data of the read image to the storing location of the cloud service according to the processing information; and issuing with the image processing device a print instruction to print the image with a printer designated by the second user transmitted to the storing location in response to receipt of the client's identification information included in the processing information.

6. A non-transitory computer readable medium storing a program causing a computer to execute a process for image processing for use by a first user to read image data and instruct printing on behalf of a second user, the process comprising:

receiving a processing identifier of the second user who has previously input the processing identifier into a different device from the computer, the processing identifier being associated with image reading processing, the receipt of the processing identifier indicating that the first user is to perform image reading for the second user;

acquiring processing information associated with the processing identifier from a cloud service, the processing information including at least information regarding an image reading condition, a storing location of the cloud service, and client's identification information;

reading an image on the basis of the image reading condition of the processing information;

transmitting data of the read image to the storing location of the cloud service according to the processing information; and issuing a print instruction to print the image with a printer designated by the second user transmitted to the storing location in response to receipt of the client's identification information included in the processing information.

* * * * *